United States Patent
Burgers et al.

(10) Patent No.: US 10,608,305 B2
(45) Date of Patent: Mar. 31, 2020

(54) COUNTER-FLOW HEAT EXCHANGER WITH IN-LINE FITTINGS

(71) Applicant: Dana Canada Corporation, Oakville (CA)

(72) Inventors: John G. Burgers, Oakville (CA); Benjamin A. Kenney, Toronto (CA)

(73) Assignee: Dana Canada Corporation, Oakville (CA)

( * ) Notice: Subject to any disclaimer, the term of this patent is extended or adjusted under 35 U.S.C. 154(b) by 216 days.

(21) Appl. No.: 15/875,250

(22) Filed: Jan. 19, 2018

(65) Prior Publication Data
US 2018/0205125 A1    Jul. 19, 2018

Related U.S. Application Data

(60) Provisional application No. 62/448,162, filed on Jan. 19, 2017.

(51) Int. Cl.
*H01M 10/6568* (2014.01)
*F28F 9/02* (2006.01)
(Continued)

(52) U.S. Cl.
CPC .......... *H01M 10/6568* (2015.04); *F28F 3/12* (2013.01); *F28F 9/0204* (2013.01); *F28F 9/0221* (2013.01); *F28F 9/0224* (2013.01); *F28F 9/0248* (2013.01); *F28F 9/0265* (2013.01); *F28F 13/06* (2013.01); *H01M 10/613* (2015.04); *H01M 10/625* (2015.04); *H01M 10/6556* (2015.04); *F28D 1/035* (2013.01);
(Continued)

(58) Field of Classification Search
CPC ............ H01M 6/5038; H01M 8/0267; H01M 8/04074; H01M 10/613; H01M 10/615; H01M 10/617; H01M 10/625; F28F 3/00; F28F 3/04; F28F 3/048; F28D 1/0308; F28D 1/0341; F28D 9/0031; F28D 9/0056; F28D 2021/0043
See application file for complete search history.

(56) References Cited

U.S. PATENT DOCUMENTS 8,062,802 B2    11/2011  Devriendt et al.
8,122,946 B2 *   2/2012  Daly ...................... F25J 1/0022
                                                       165/135
(Continued)

*Primary Examiner* — Jianying C Atkisson
*Assistant Examiner* — Jose O Class-Quinones
(74) *Attorney, Agent, or Firm* — McCoy Russell LLP

(57) ABSTRACT

A counterflow heat exchanger for battery thermal management has a base plate, a cover plate and manifold cover. The base plate includes alternating first and second longitudinal fluid flow passages. The cover plate is sealed to the base plate to enclose the first and second fluid flow passages, and includes a first fluid opening and a plurality of second fluid openings arranged at spaced apart intervals across a width of the cover plate. The manifold cover includes an embossment surrounded by a peripheral flange which is sealed to the cover plate and surrounds at least the plurality of second fluid openings. The interior of the embossment defines a manifold chamber in flow communication with the second fluid openings in the cover plate. The top of the manifold cover has at least a second fluid opening in flow communication with the plurality of second fluid openings through the manifold chamber.

24 Claims, 24 Drawing Sheets

(51) Int. Cl.
  *F28F 3/12*    (2006.01)
  *H01M 10/625*  (2014.01)
  *H01M 10/613*  (2014.01)
  *F28F 13/06*   (2006.01)
  *H01M 10/6556* (2014.01)
  *F28D 1/03*    (2006.01)

(52) U.S. Cl.
  CPC . *F28F 2009/0297* (2013.01); *F28F 2250/102* (2013.01); *H01M 2220/20* (2013.01)

(56) References Cited

U.S. PATENT DOCUMENTS

| | | | |
|---|---|---|---|
| 8,863,543 B2 | 10/2014 | Heckenberger et al. | |
| 8,877,366 B2 | 11/2014 | Weber et al. | |
| 9,318,782 B2 | 4/2016 | Hirsch | |
| 9,452,686 B2 | 9/2016 | Yang et al. | |
| 9,520,626 B2 | 12/2016 | Abels et al. | |
| 9,531,045 B2 | 12/2016 | Girmscheid et al. | |
| 9,711,829 B2 | 7/2017 | Haussmann | |
| 9,829,256 B2 | 11/2017 | Abels | |
| 2004/0238162 A1* | 12/2004 | Seiler | F02M 31/20 165/148 |
| 2008/0202730 A1* | 8/2008 | Onishi | F28D 15/00 165/104.28 |
| 2012/0107663 A1 | 5/2012 | Burgers et al. | |
| 2012/0156543 A1* | 6/2012 | Cicero | H01M 2/024 429/120 |
| 2013/0189557 A1* | 7/2013 | Haussmann | F28D 7/06 429/120 |
| 2014/0017545 A1 | 1/2014 | Palanchon et al. | |
| 2014/0224452 A1* | 8/2014 | Abels | F28F 1/00 165/104.11 |
| 2015/0079442 A1* | 3/2015 | Haussmann | H01M 10/625 429/120 |
| 2015/0086831 A1* | 3/2015 | Haussmann | H01M 10/625 429/120 |
| 2015/0244037 A1* | 8/2015 | Jairazbhoy | B60L 50/50 429/120 |
| 2015/0316299 A1* | 11/2015 | Grunwald | H01L 35/28 62/3.2 |
| 2016/0036104 A1 | 2/2016 | Kenney et al. | |
| 2016/0049705 A1 | 2/2016 | Mahe et al. | |
| 2016/0204486 A1 | 7/2016 | Kenney et al. | |
| 2016/0315365 A1 | 10/2016 | Vanderwees et al. | |

* cited by examiner

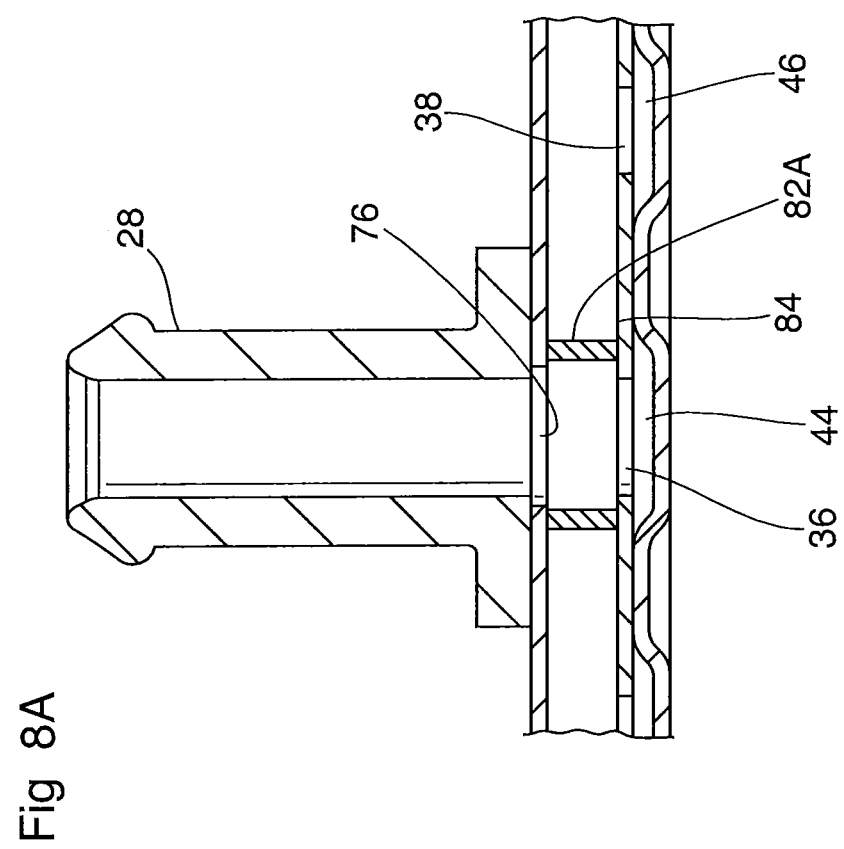

COUNTER-FLOW HEAT EXCHANGER WITH IN-LINE FITTINGS

CROSS-REFERENCE TO RELATED APPLICATION

This application claims priority to and the benefit of U.S. Provisional Patent Application No. 62/448,162 filed Jan. 19, 2017, the contents of which are incorporated herein by reference.

TECHNICAL FIELD

This disclosure relates to heat exchangers for battery thermal management applications. More specifically, the disclosure relates to a battery cell heat exchanger that can be arranged underneath a stack of a plurality of adjacent battery cells or battery cell containers or that can be arranged in between the adjacent battery cells or battery cell containers within a stack, the battery cell heat exchanger dissipating heat in rechargeable battery units.

BACKGROUND

Rechargeable batteries such as batteries made up of many lithium-ion cells can be used in many applications, including for example, electric propulsion vehicle ("EV") and hybrid electric vehicle ("HEV") applications. These applications often require advanced battery systems that have high energy storage capacity and can generate large amounts of heat that needs to be dissipated. Battery thermal management of these types of systems generally requires that the maximum temperature of the individual cells be below a predetermined, specified temperature.

Cold plate heat exchangers are heat exchangers upon which a stack of adjacent battery cells or battery cell containers housing one or more battery cells are arranged for cooling and/or regulating the temperature of a battery unit. The individual battery cells or battery cell containers are arranged in face-to-face contact with each other to form the stack, the stack of battery cells or battery cell containers being arranged on top of a cold plate heat exchanger such that an end face or end surface of each battery cell or battery cell container is in surface-to-surface contact with a surface of the heat exchanger.

Heat exchangers for cooling and/or regulating the temperature of a battery unit can also be arranged between the individual battery cells or individual battery cell containers that form the stack, the individual heat exchangers being interconnected by common inlet and outlet manifolds. Heat exchangers that are arranged or "sandwiched" between the adjacent battery cells or battery cell containers in the stack may sometimes be referred to as inter-cell elements (e.g. "ICE" plate heat exchangers) or cooling fins.

Examples of cold plate heat exchangers and inter-cell elements (or ICE plate heat exchangers) are described in commonly assigned U.S. patent application Ser. No. 14/972,463 entitled COUNTER-FLOW HEAT EXCHANGER FOR BATTERY THERMAL MANAGEMENT APPLICATIONS (Publication No. US 2016/0204486 A1), which is incorporated herein by reference in its entirety.

Each cold plate heat exchanger or ICE plate heat exchanger includes an inlet and an outlet for the cooling fluid, and the inlet and outlet may be provided with fittings to permit connection of the heat exchanger to a coolant circulation system of the vehicle. Due to space constraints, the location and orientation of these fittings is significant, and it is desirable to design these heat exchangers such that the fitting locations and/or orientations can be varied with minimal retooling.

SUMMARY OF THE PRESENT DISCLOSURE

In an aspect there is provided a counterflow heat exchanger for thermal management of a battery unit having at least one battery cell container. Each of the battery cell containers houses one or more battery cells.

The counterflow heat exchanger comprises a base plate having a central, generally planar portion having opposed first and second ends, the central portion being surrounded by a peripheral flange and including a plurality of alternating first and second fluid flow passages extending between the first and second ends of the central portion Each of the first and second fluid flow passages has a first end and a second end, and is parallel to a longitudinal axis of the heat exchanger.

The counterflow heat exchanger further comprises a cover plate arranged over top of and in sealing engagement with the base plate. The plurality of first and second fluid flow passages are enclosed between the cover plate and the base plate. The cover plate has a first, generally planar region defining a primary heat transfer surface of the heat exchanger, and a second generally planar region formed at one end of the cover plate. The second generally planar region includes a first fluid opening and a plurality of second fluid openings arranged at spaced apart intervals across a width of the cover plate.

The counterflow heat exchanger further comprises a manifold cover arranged over top of the second generally planar region of the cover plate. The manifold cover comprises an embossment surrounded by a peripheral flange which is sealed to the cover plate and surrounds at least the plurality of second fluid openings.

A top surface of the embossment defines a top of the manifold cover and a bottom surface of the peripheral flange of the manifold cover defines a bottom of the manifold cover. An interior of the embossment defines a manifold chamber which is in flow communication with the plurality of second fluid openings in the cover plate. The top of the manifold cover is provided with at least a second fluid opening which is in flow communication with the plurality of second fluid openings through the manifold chamber.

BRIEF DESCRIPTION OF THE DRAWINGS

Reference will now be made, by way of example, to the accompanying drawings which show example embodiments of the present application, and in which:

FIGS. 8A and 8B are enlarged, partial cross-sections showing alternate arrangements of the fluid flow conduit of the manifold covers described herein;

Similar reference numerals may have been used in different figures to denote similar components.

DESCRIPTION OF EXAMPLE EMBODIMENTS

Figure 1A:
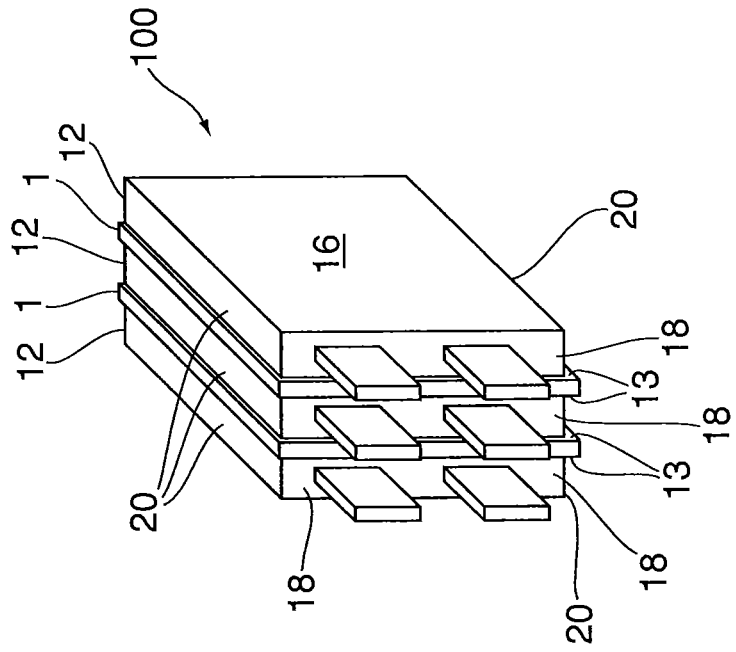
FIG. 1A is a schematic illustration of a battery unit incorporating a battery cooling heat exchanger in the form of individual heat exchanger panels or ICE plate cooling plates.
Figure 1:
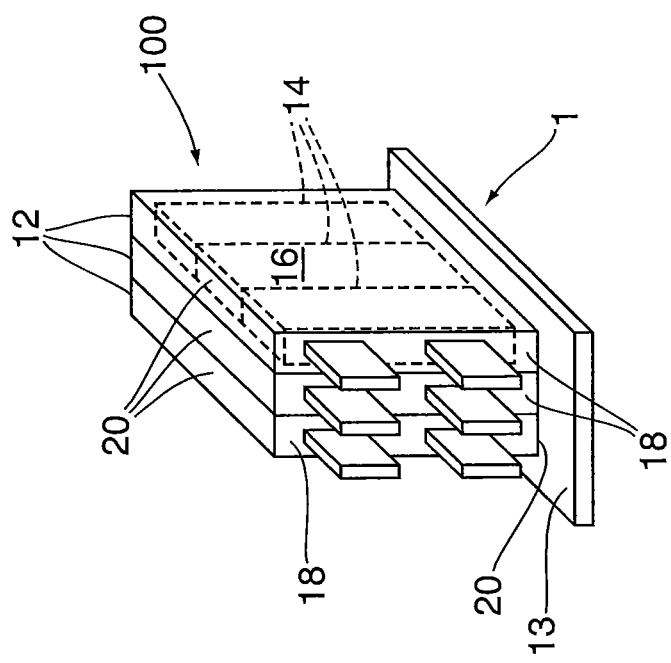
FIG. 1 is a schematic illustration of a battery unit incorporating a battery cooling heat exchanger in the form of a cold plate heat exchanger.
Figure 2:
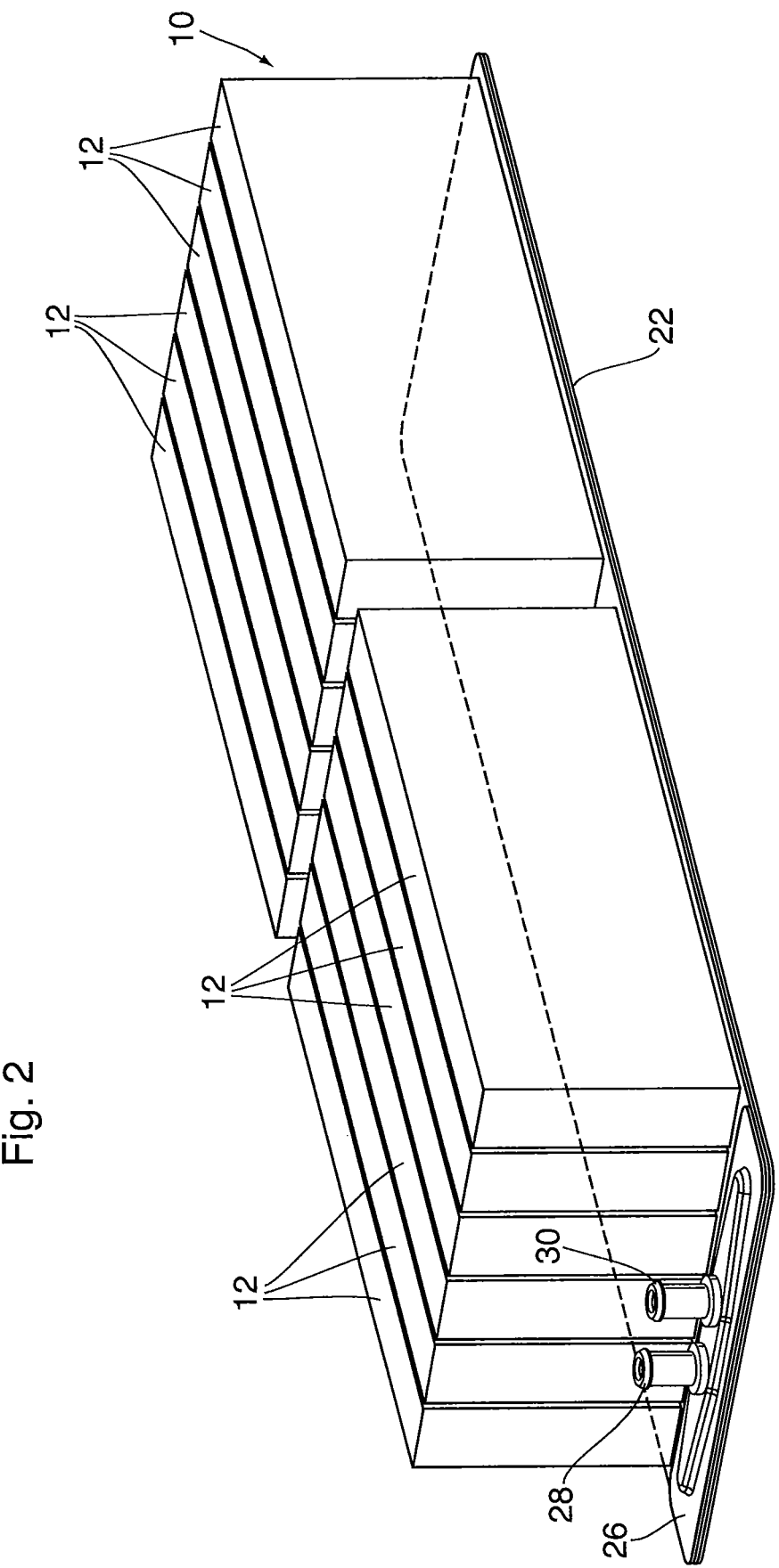
FIG. 2 shows a battery unit incorporating a battery cooling heat exchanger in the form of a cold plate counter-flow heat exchanger according to a first embodiment of the present disclosure.

FIGS. 1 and 2 show battery cooling heat exchanger constructions as described in above-mentioned U.S. patent application Ser. No. 14/972,463, and are labeled "PRIOR ART".

Referring now to FIG. 1, there is shown a schematic, illustrative example of a rechargeable battery unit 100 employing a battery cooling heat exchanger 1. The battery unit 100 is made up of a series of individual battery cell containers 12 that may each house one or more battery cells 14. While three individual battery cells 14 are schematically illustrated in FIG. 1, it will be understood that the number of battery cells 14 housed within the battery cell container 12 may vary depending upon the particular design and/or application of the battery unit 100 and that the present disclosure is not intended to be limited to battery units having three battery cell containers 12 with three battery cells 14 arranged therein.

The individual battery cell containers 12 that house the one or more battery cells 14 each define a pair of opposed long, side faces 16, a pair of opposed, short side faces 18 and a pair of end faces 20 arranged generally perpendicular to the side faces 16, 18. In the illustrative example shown in FIG. 1, the individual battery cell containers 12 are arranged so that the long side faces 16 of adjacent battery cell containers 12 are in face-to-face or surface-to-surface contact with each other as they are stacked together to form the battery unit 100, the plurality of battery cell containers 12 being stacked on top of the battery cooling heat exchanger 1. Accordingly, in the arrangement illustrated in FIG. 1, one of the end faces 20 of each battery cell container 12 is in surface-to-surface contact with a primary heat transfer surface 13 of the heat exchanger 1. In such an arrangement, the battery cooling heat exchanger 1 is often referred to as a "cold plate" or "cold plate heat exchanger" as the battery cell containers 12 are in contact with only one side of the heat exchanger 1. As a result of this arrangement, cold plate heat exchangers typically provide a large surface area for accommodating battery stacks made up of a plurality of battery cell containers 12, the large surface area functioning as the primary heat transfer surface 13 of the heat exchanger 1. Cold plate heat exchangers also tend to be more robust in structure as the heat exchanger must support the plurality of battery cell containers 12 stacked on top of the heat exchanger 1. In some embodiments, multiple battery units 100 that each comprise a series of adjacent battery cell containers 12 housing one or more battery cells 14 are arranged on a single battery cooling heat exchanger 1 or cold plate as shown, for instance, in FIG. 2.

Referring now to FIG. 1A there is shown an illustrative example of a battery cooling heat exchanger 1 in the form of an inter-cell element or ICE plate heat exchanger. As shown, the individual battery cell containers 12 are arranged so as to be sandwiched between individual battery cooling heat exchangers 1 (or heat exchanger panels or plates, sometimes referred to as cooling plates or fins). Although not illustrated in the drawings, battery cell heat exchangers 1 can also be arranged at either end of the battery unit 100 to ensure that each long side panel 16 of each battery cell container 12 is in contact with a battery cell heat exchanger 1.

Therefore, the arrangement of FIG. 1 provides a single battery cell heat exchanger (or cold plate) 1 to cool the entire battery unit 100, with the smaller end faces 20 of the battery cell containers 12 stacked on top of a single primary heat transfer surface 13 of heat exchanger 1. In contrast, the arrangement of FIG. 1A provides a plurality of battery cell heat exchangers (or ICE plates) 1 to cool the larger side faces 16 of the battery cell containers 12, heat exchangers 1 each having a pair of opposed primary heat transfer surfaces 13 for contacting the adjacent battery cell container 12, with the heat exchangers 1 and containers 12 being interleaved with or sandwiched between one another.

Therefore, in the example of FIG. 1 only one side of the battery cooling heat exchanger 1 is in contact with the battery cells 14 and/or battery cell containers 12, while in the example of FIG. 1A both sides of the battery cooling heat exchangers 1 are in contact with the battery cell containers 12.

Figure 3:
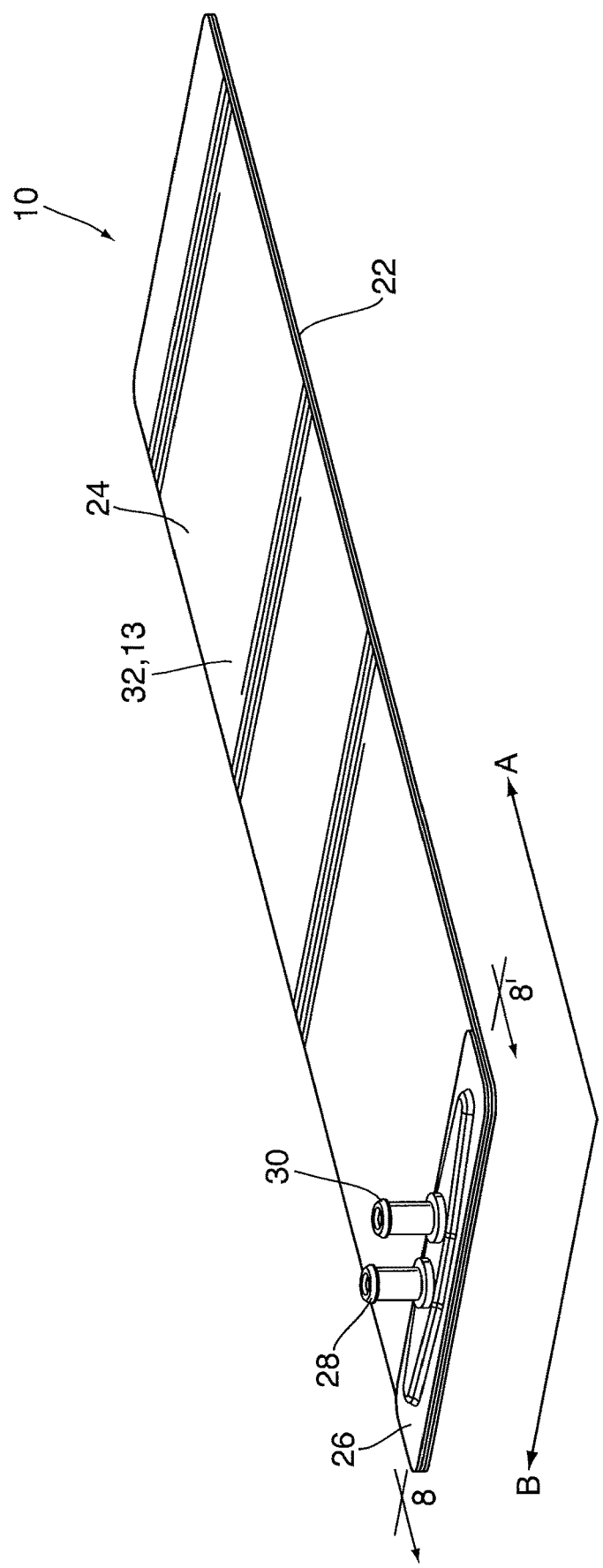
FIG. 3 is a perspective view of the counterflow heat exchanger according to the first embodiment, shown without the battery cell containers.

Referring now to FIGS. 2 and 3, there is shown a battery cooling heat exchanger 10 according to a first embodiment of the present disclosure, comprising a cold plate heat exchanger. As shown, the battery cooling heat exchanger 10 is comprised of two main heat exchanger plates, more specifically a formed base plate 22 and a cover plate 24, a manifold plate or manifold cover 26, and first and second fittings 28, 30. The heat exchanger 10 shown as being elongate, with the long sides thereof extending along a first axis A, wherein axis A is also referred to herein as the longitudinal axis.

Cover plate 24 has a first, generally planar region 32 upon which the individual battery cell containers 12 are stacked when the heat exchanger 10 is arranged together with the battery unit 100, as shown in FIG. 2. The first region 32 of cover plate 24 defines the primary heat transfer surface 13 of heat exchanger 10 and corresponds to the portion of cover plate 24 on which the battery cell containers 12 are supported. Cover plate 24 also includes a second generally planar region 34 formed at one end thereof, adjacent to first region 32, which is also referred to herein as "manifold region 34". In the illustrated embodiment, both the first and second regions 32, 34 of cover plate 24 are flat and planar, such that the entire cover plate 24 is flat and planar. It will be appreciated that the manifold region 34 has a relatively small area in comparison to the first region 32, in order to maximize the area of the primary heat transfer surface 13, i.e. surface area of the cover plate 24 along which heat is transferred between the heat exchanger 10 and the battery cells 14 and/or battery cell containers 12.

Figure 4:
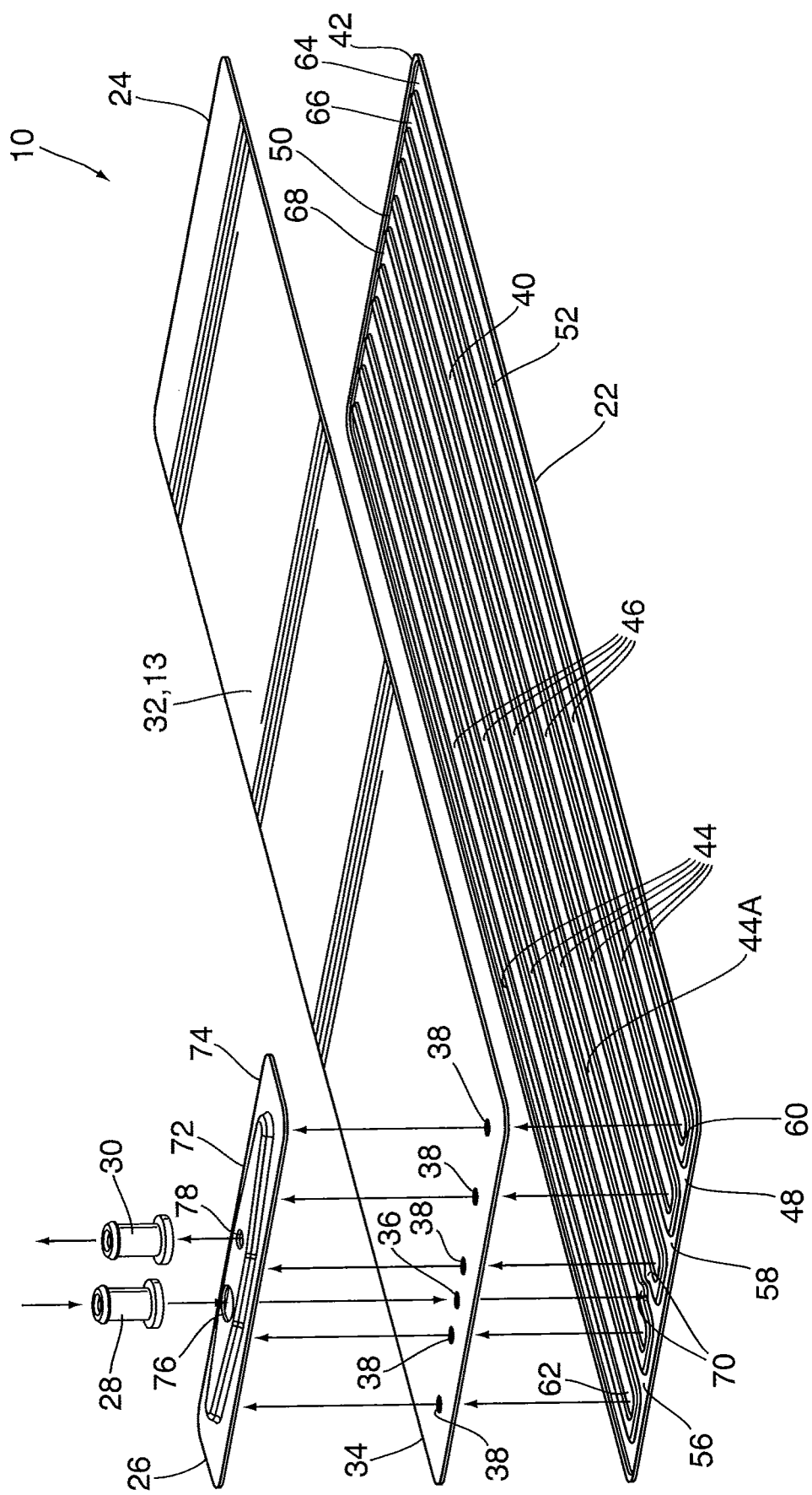
FIG. 4 is a perspective exploded view of the counterflow heat exchanger of FIG. 3.
Figure 5:
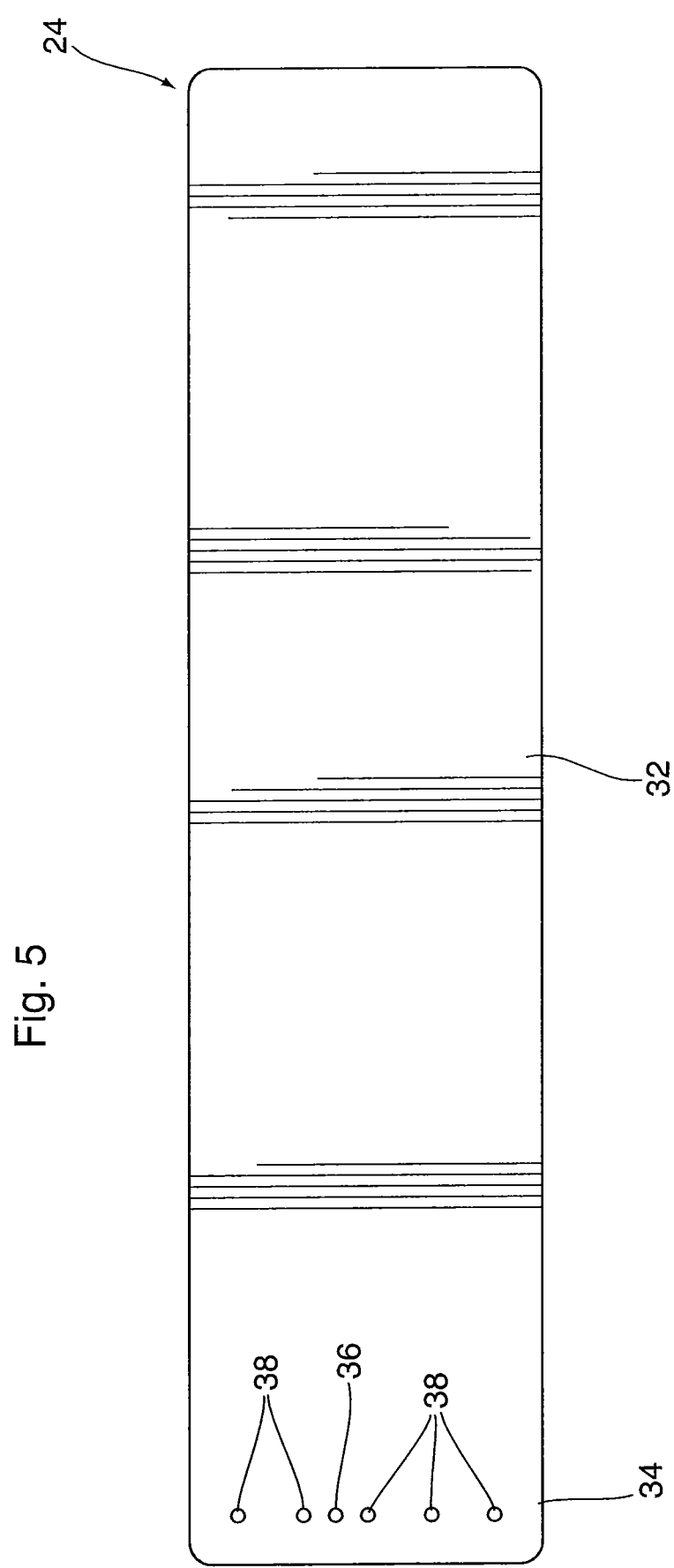
FIG. 5 is a plan view of the cover plate of the counterflow heat exchanger of FIG. 3.

As shown in FIGS. 4 and 5, the manifold region 34 includes a plurality of first and second fluid openings 36, 38 arranged at spaced apart intervals across the width of the cover plate 24, the width being defined along a second axis B which is perpendicular to first axis A, wherein second axis B is also referred to herein as the transverse axis, and is parallel to the end edges of the heat exchanger 10.

More specifically, the manifold region 34 includes a single first fluid opening 36 and a plurality of second fluid openings 38, for reasons which will be explained in detail below. The first and second fluid openings 36, 38 are shown as being arranged in a single row parallel to the transverse axis B, and equidistantly spaced from an end of the heat exchanger 10. However, co-linear arrangement of fluid openings 36, 38 is not strictly required in all cases. Also, the cover plate 24 may include more or fewer second fluid openings 38 than the five which are illustrated, the number of openings 38 depending on the number of fluid flow passages in the base plate 22.

Base plate 22 is generally in the form of an upside-down, dished-plate having a central, generally planar portion 40 surrounded by a peripheral flange 42, the central generally planar portion 40 being located below the plane of the peripheral flange 42 in the orientation shown in the drawings. A plurality of first and second fluid flow passages 44, 46 are formed in the central, generally planar portion 40 of the base plate 22, the first and second fluid flow passages 44, 46 extending generally between the opposed first and second ends 48, 50 of the central portion 40 of base plate 22, parallel to the longitudinal axis A.

As mentioned above, the heat exchanger 10 is a counter-flow heat exchanger, meaning that the first and second fluid flow passages 44, 46 are arranged in alternating order across the width of the heat exchanger 10 and the width of base plate 22, i.e. along the transverse axis B. With this counter-flow arrangement, fluid flows in opposite directions in each adjacent pair of first and second fluid flow passages 44, 46, and the inlet and outlet and their associated fittings 28, 30 are located at one end of the heat exchanger 10. In the counter-flow heat exchanger 10, each pair of adjacent first and second fluid flow passages 44, 46 defines a U-shaped flow path, with the first flow passage 44 being a feed flow passage and the second flow passage 46 being a return flow passage, or vice versa, depending on the direction of fluid flow. In contrast, a "U-flow" or a serpentine flow configuration generally provides a first plurality of first flow passages arranged next to a plurality of second flow passages.

Base plate 22 is typically made from a thin sheet of metal material that is stamped to form the first and second fluid flow passages 44, 46, the flow passages 44, 46 being formed by elongate depressions or trough regions formed in the central, generally planar portion 40 of the base plate 22. The individual trough regions defining adjacent flow passages 44, 46 are separated by elongate ridges 52 extending continuously along the longitudinal axis A. In the present embodiment the elongate ridges 52 are generally straight and parallel to one another and the longitudinal axis A, although the elongate ridges 52 may include non-linear regions in some embodiments. The elongate ridges 52 may have flat upper surfaces 54 which are generally co-planar with peripheral flange 42 and which, together with peripheral flange 42, provide contact surfaces or brazing surfaces for surface-to-surface contact with the cover plate 24 when the base plate 22 and cover plate 24 are brazed or otherwise sealed together.

Figure 6:
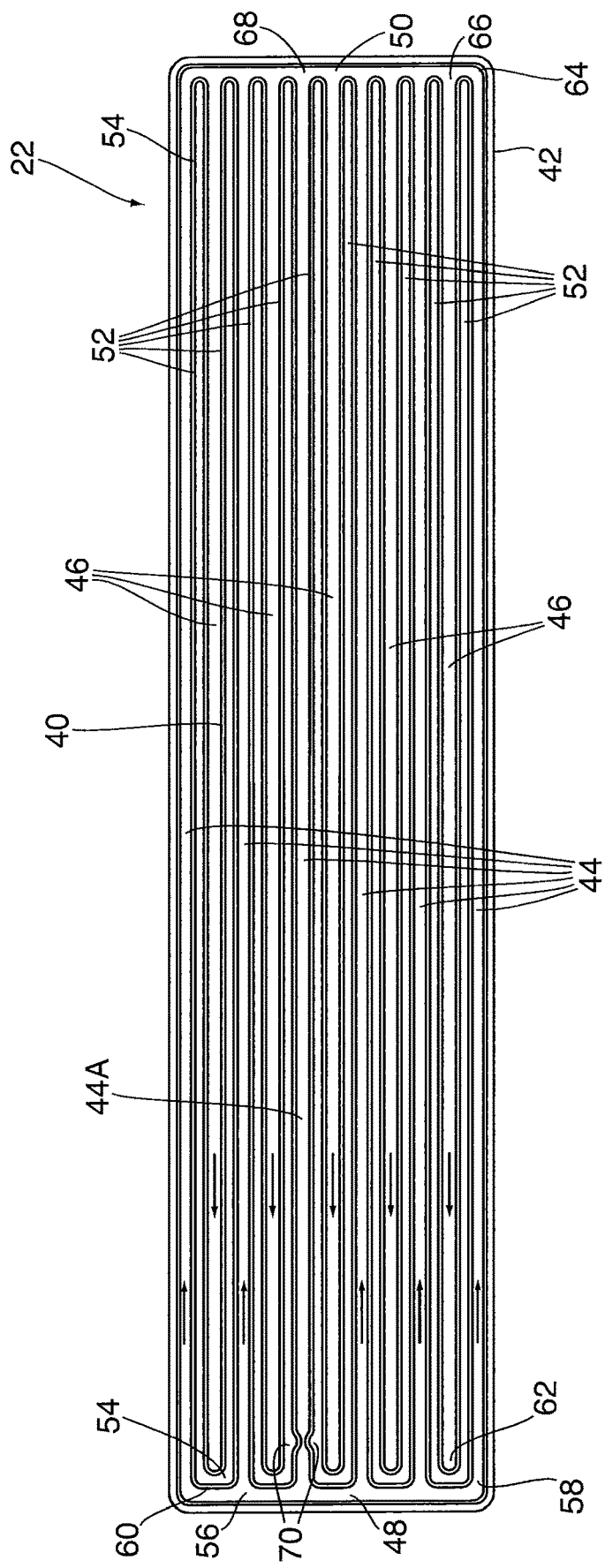
FIG. 6 is a plan view of the base plate of the counterflow heat exchanger of FIG. 3, illustrating the flow dynamics through the base plate.
Figure 7:
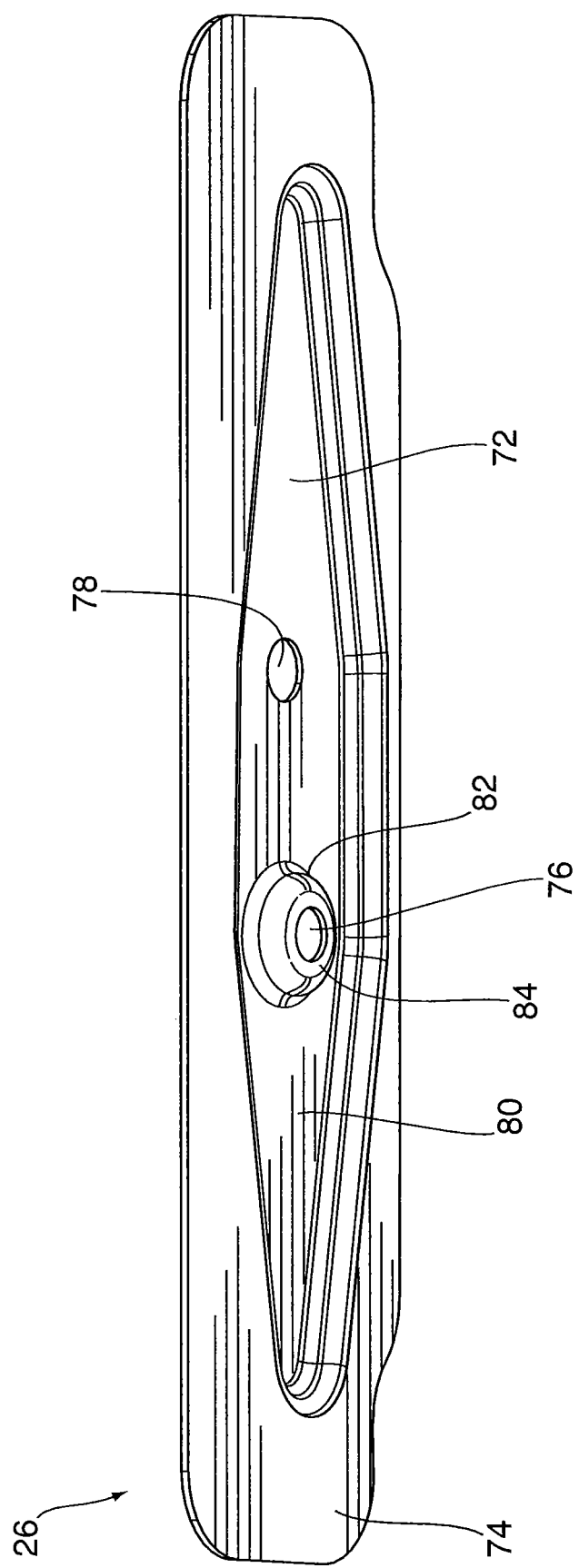
FIG. 7 is a perspective view of the underside of the manifold cover of the counterflow heat exchanger of FIG. 3.

The counterflow routing of fluid along the central portion 40 of base plate 22 is shown by the arrows in FIG. 6. Proximate to the first end 48 of the central portion 40 of base plate 22 there is provided a manifold region 56 which is enclosed between the cover plate 24 and the base plate 22 and is in fluid communication with first open ends 58 of the first fluid flow passages 44 and with the first fluid opening 36 in the cover plate 24. The manifold region 56 is formed by providing a gap between the first end 48 of central portion 40, and the first ends of elongate ridges 52. The manifold region 56 receives fluid from, or distributes fluid to, the first fluid flow passages 44, depending on whether it is an inlet manifold or outlet manifold.

As can be seen from FIGS. 4 and 6, the central portion 40 of base plate 22 also comprises a plurality of transverse ridges 60 joining the first end of each elongate ridge 52 to the first end of an adjacent elongate ridge 52. The transverse ridges 60 also have flat upper surfaces 54 which are sealed to the cover plate 24, for example by brazing, so as to close off the first ends 62 of the second fluid flow passages 46 and thereby prevent fluid communication between the manifold region 56 and the first ends 62 of the second fluid flow passages 46. Accordingly, as shown in FIG. 6, each pair of elongate ridges 52 joined by a transverse ridge 60 defines an elongate U-shaped rib structure, and a plurality of these U-shaped ridge structures are spaced across the width of the base plate 22.

The elongate ridges 52 each have a second end which is spaced from the second end 50 of the central portion 40 of the base plate 22. This spacing provides the first and second fluid flow passages 44, 46 with open second ends 64, 66, and also provides a transverse gap 68 at the second end 50 of central portion 40. The transverse gap 68 is in flow communication with the open second ends 64, 66 of the first and second fluid flow passages 44, 46, thereby providing a manifold or turnaround space to allow the fluid flow to change direction and flow between the first and second fluid flow passages 44, 46.

In the present embodiment, the manifold region 56 comprises an inlet manifold which distributes the flow transversely across the base plate 22. From the manifold region 56, the fluid enters the open first ends 58 of first fluid flow passages 44 (i.e. feed flow passages) and flows toward the second end 50 of central portion 40, where it enters the transverse gap 68 through the open second ends 64 of the first fluid flow passages 44. The fluid then enters the open second ends 66 of the second fluid flow passages 46 (i.e. return flow passages), and flows back toward the closed first ends 62 of the second fluid flow passages 46.

As mentioned above, cover plate 24 is provided with a transversely extending row of first and second fluid openings 36, 38. Each of the second fluid openings 38 is located so as to be aligned with the closed first end 62 of one of the second fluid flow passages 46 and in flow communication therewith. Therefore, the fluid reaching the closed first ends 62 of second fluid flow passages 46 will be discharged from the second flow passages 46 through second fluid openings 38.

The first fluid opening 36 is located so as to be aligned with one of the first fluid flow passages 44 (identified in FIG. 6 as 44A) and in flow communication with the manifold region 56. Thus, fluid enters the manifold region 56 through the first fluid opening 36. In order to prevent fluid entering through first fluid opening 36 from bypassing the manifold region 56, the first fluid flow passage 44A which is aligned with the first fluid opening 36 is at least partially blocked at a point between the first fluid opening 36 and the second end 50 of the central portion 40 of base plate 22. Flow passage 44A is sometimes referred to herein as "at least partially blocked flow passage 44A".

There are numerous ways in which the at least partially blocked flow passage 44A may be formed. For example, a blocking member may be placed into the trough portion defining the at least partially blocked flow passage 44A. Alternatively, as shown in the drawings, the ridges 52 defining the at least partially blocked flow passage 44A may be locally deformed so as to form protrusions 70 extending into the flow passage 44A and blocking it. It will be appreciated that the protrusions 70 may be conveniently formed by adding simple tooling to the die which is used to form the base plate 22.

The at least partially blocked flow passage 44A is shown as being approximately centrally located along the transverse axis B. However, this is not necessary, and the location of the at least partially blocked flow passage 44A and first fluid opening 36 can be changed in accordance with the requirements of specific applications. In this regard, the first fluid opening 36 can be relocated so as to align with any of the first fluid flow passages 44, and any of the first fluid flow passages 44 can be converted to an at least partially blocked flow passage 44A. Therefore, in cases where it is desirable to maintain flexibility and minimize tooling costs, the tool(s) which form the protrusions 70 may be separate from the tool(s) which form the ridges 52, 60 and the peripheral flange 42 of the base plate 22. Although not desired in the present embodiment, the longitudinal locations of the first fluid opening 36 and the protrusions 70 can be varied so as to provide additional flexibility.

Manifold cover 26 is arranged over top of the manifold region 34 on cover plate 24. The manifold cover 26 has an embossment 72 surrounded by a peripheral flange 74 which is adapted to be sealed to the cover plate 24, for example by brazing, and to surround all the fluid openings 36, 38. The top surface of embossment 72, which is flat in the present embodiment, defines the top of the manifold cover 26; and the bottom surface of peripheral flange 74 defines the bottom of the manifold cover 26.

The top of the manifold cover 26 is provided with a first fluid opening 76 provided with the first tubular fitting 28, and a second fluid opening 78 provided with the second tubular fitting 30. The fittings 28, 30 are sealingly attached to the top surface of embossment 72, for example by brazing. In the present embodiment, the first fluid opening 76 and first tubular fitting 28 comprise the fluid inlet of heat exchanger 10, and are sometimes referred to herein as "inlet opening 76" and "inlet fitting 28", respectively. The second fluid opening 78 and second tubular fitting 30 comprise the fluid outlet of heat exchanger 10, and are sometimes referred to herein as the "outlet opening 78" and "outlet fitting 30", respectively.

In the present embodiment, the fluid openings 76, 78 and the tubular fittings 28, 30 may be side-by-side or "in-line", meaning that they are collinearly arranged along the transverse axis B. This in-line arrangement can be advantageous, for example to comply with specific application requirements, and also to minimize the area of the cover plate 24 which is occupied by the manifold area 34 and the manifold cover 26. In this regard, the in-line arrangement allows the manifold area 34 and manifold cover 26 to be reduced in size along the longitudinal axis A.

The interior of the embossment 72 defines a manifold chamber 80 which is in flow communication with all the second fluid openings 38 in the cover plate 24. Therefore, in the present embodiment, the manifold chamber 80 comprises an outlet manifold which receives the fluid discharged from second fluid flow passages 46 through second fluid openings 38. The second fluid opening 78 is in flow communication with the manifold chamber 80, so as to receive fluid discharged from the second fluid flow passages 46 through the second fluid openings 38. The inlet manifold on the other hand, comprises manifold region 56 which is located between the plates 22, 24. The location of one of the manifolds between the plates helps to reduce the size of the manifold area 34 and manifold cover 26 on top of the cover plate 24, further helping to maximize the area of the primary heat transfer surface 13.

The manifold cover 26 is also provided with a fluid flow conduit 82 which extends from the first fluid opening 76 at the top of the manifold cover 26 to the bottom of manifold cover 26, and has a sealing surface 84 at its bottom end for sealing to the cover plate 24, for example by brazing. In the present embodiment, the sealing surface 84 comprises a flat, annular ring which is co-planar with the bottom surface of flange 74 and seals to the surface of the cover plate 24 surrounding the first fluid opening 36 therein, thereby forming a sealed connection with the first fluid opening 36. The fluid flow conduit 82 thereby provides flow communication between the first fluid opening 36 of the cover plate 24 and the first fluid opening 76 of the manifold cover 26, providing a sealed passage through the manifold chamber 80. Therefore, the fluid entering heat exchanger 10 through first fluid opening 76 and first fitting 28 will flow through the fluid flow conduit 82, through first opening 36, into the manifold region 56 of base plate 22, and from there the fluid flows into the first fluid flow passages 44.

Figure 8:
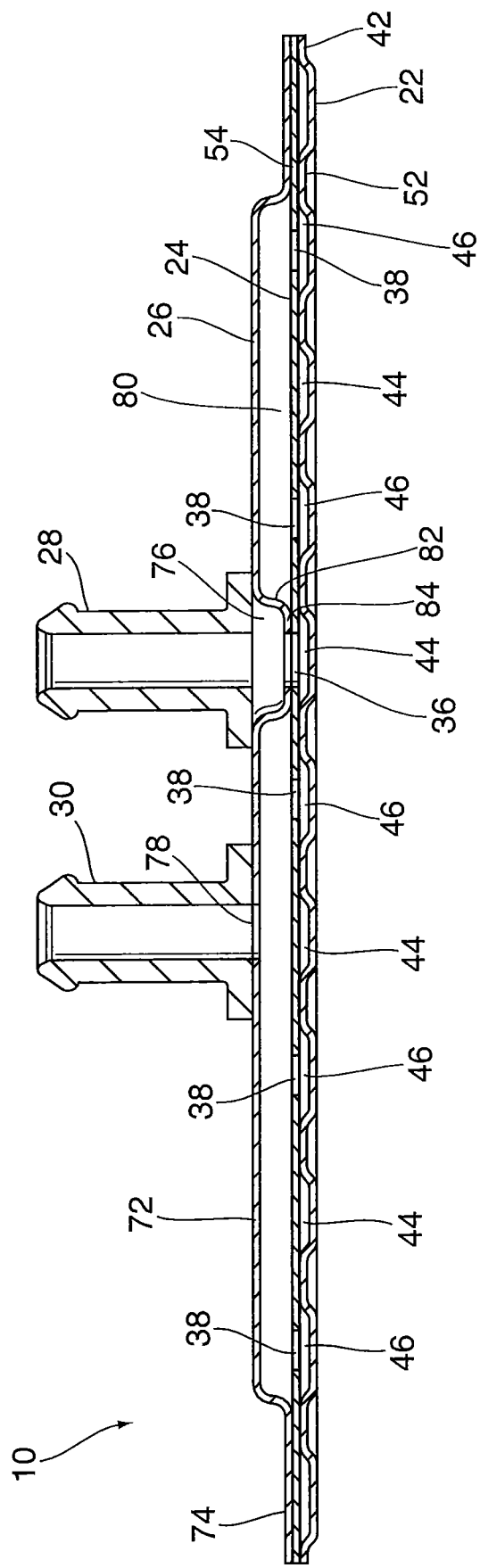
FIG. 8 is a cross-section along line 8-8' of FIG. 3.
Figure 8B:
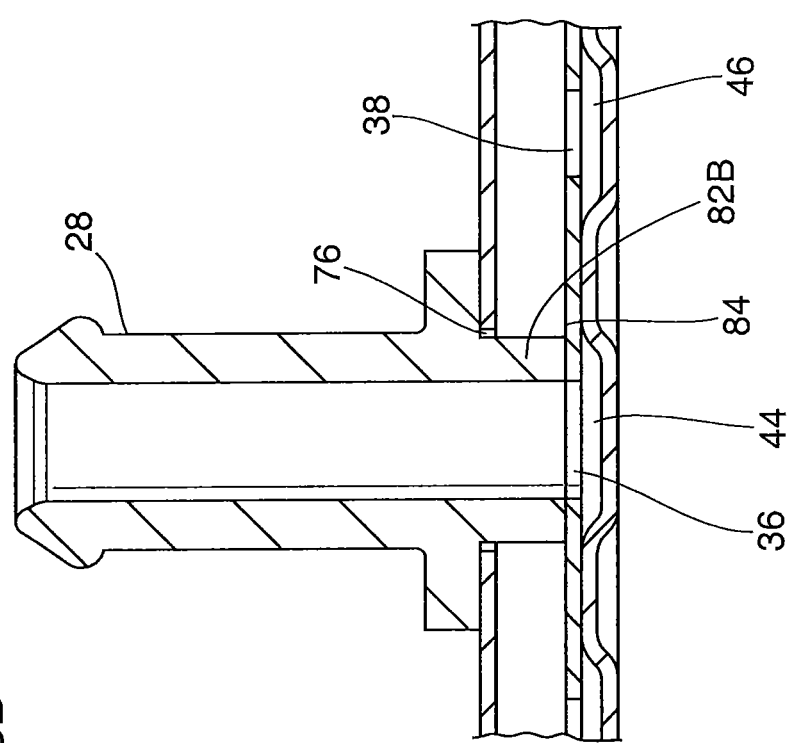
Figure 9:
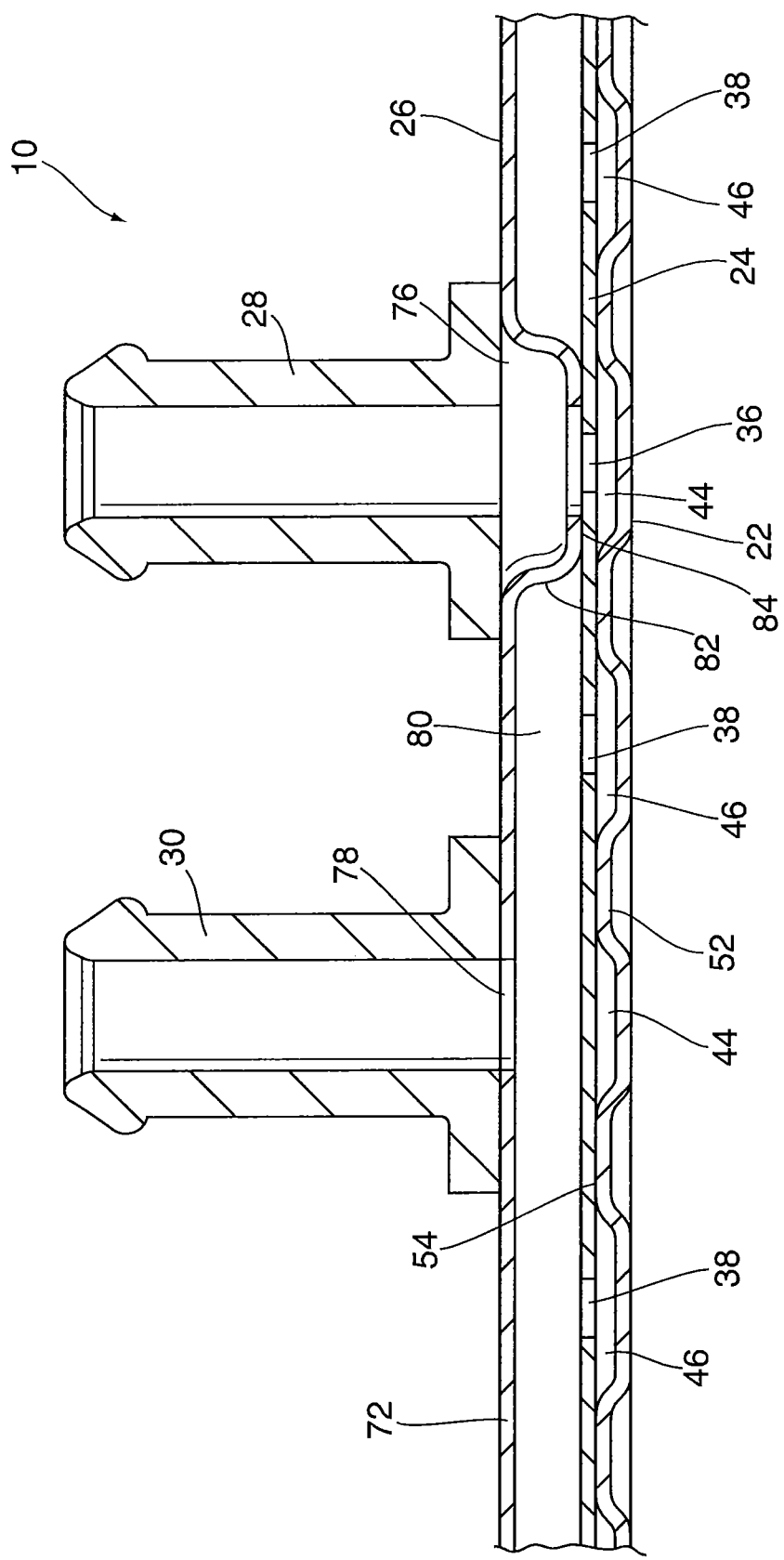
FIG. 9 is an enlarged portion of the cross-section of FIG. 8.

In the present embodiment the fluid flow conduit 82 is integrally formed as part of the manifold cover 26, and is in the form of an apertured boss protruding downwardly from the top of manifold cover 26, for example as shown in FIG. 8. However, it will be appreciated that the fluid flow conduit 82 may take the form of a separately formed tubular piece 82A which is sealingly secured inside the manifold cover 26 as shown in FIG. 8A or, as described further below, may comprise an extension 82B of fitting 28 as shown in FIG. 8B.

In use, fluid entering the heat exchanger 10 through first fluid fitting 28 and first fluid opening 76 in embossment 72, flows through the fluid flow conduit 82, and is distributed to each of the first flow passages 44 through first fluid opening 36 of cover plate 24 and through manifold region 56, and flows through each of the individual first fluid flow passages 44 from the first end 48 to the second end 50 of the central portion 40 of base plate 22. Once the fluid reaches the second end 50, it reverses direction at transverse gap 68 and then flows through the second fluid flow passages 46 toward the first end 48. The fluid then flows through second fluid openings 38 in cover plate 24 and enters manifold chamber 80 before exiting the heat exchanger 10 through second fluid opening 78 and second fluid fitting 30.

The counterflow arrangement provided by the alternating first and second fluid flow passages 44, 46 helps to improve the overall temperature uniformity across the surface of the heat exchanger 10 which, in turn, may serve to improve the overall thermal management of the battery unit(s) 100 arranged in thermal contact with the heat exchanger 10. In addition, as mentioned above, the heat exchanger structure permits, but does not require, co-linear arrangement of the inlet and outlet fittings 26, 28, as may be required by a specific application. In addition, the heat exchanger structure described above permits the flexible placement of the first and second fluid fittings 28, 30 along the width of the heat exchanger, while minimizing tooling costs.

A counterflow heat exchanger 110 according to a second embodiment is now described with reference to FIGS. 10-16, with like reference numerals being used to identify similar features.

Figure 10:
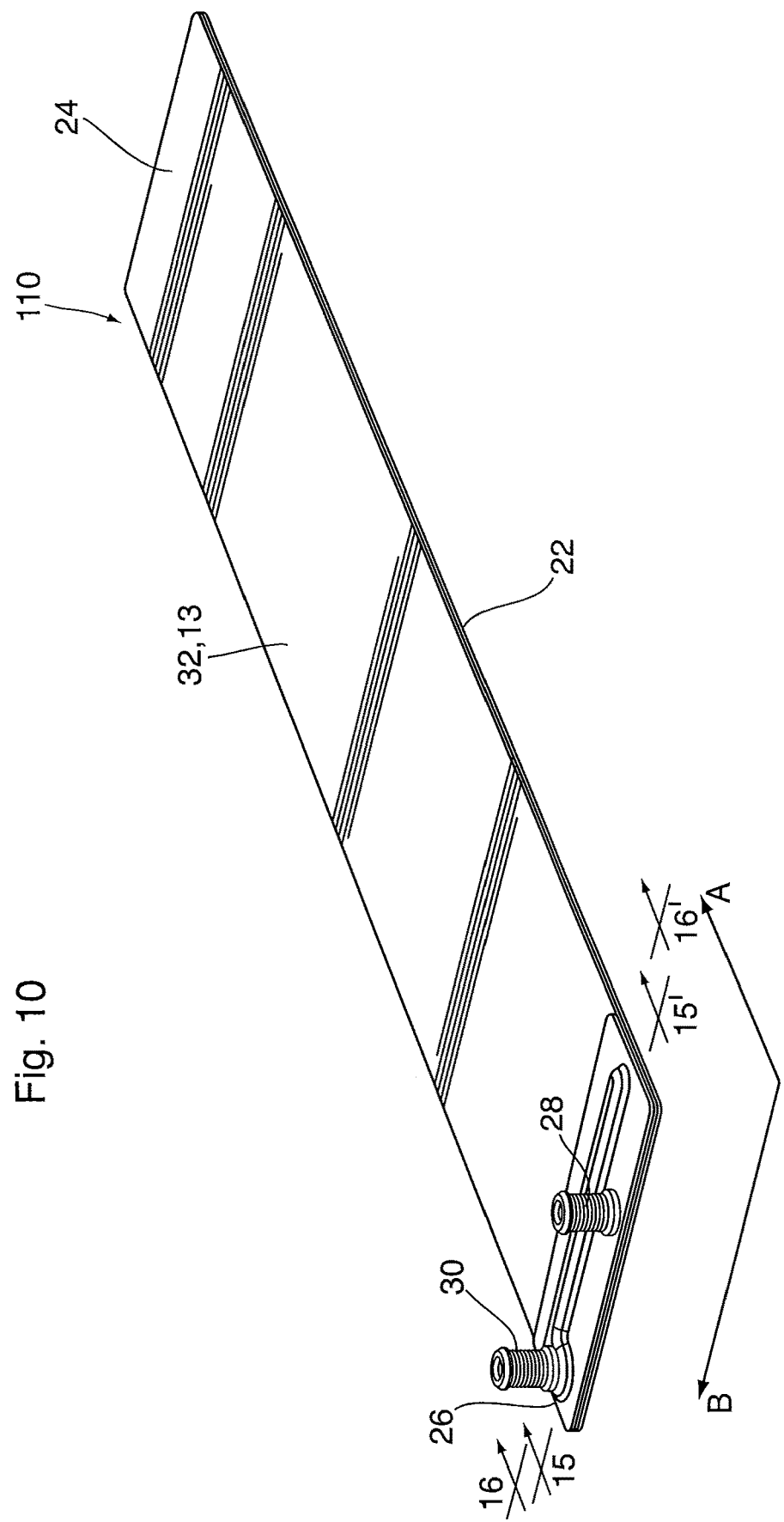
FIG. 10 is a perspective view of a counterflow heat exchanger according to a second embodiment of the present disclosure.
Figure 11:
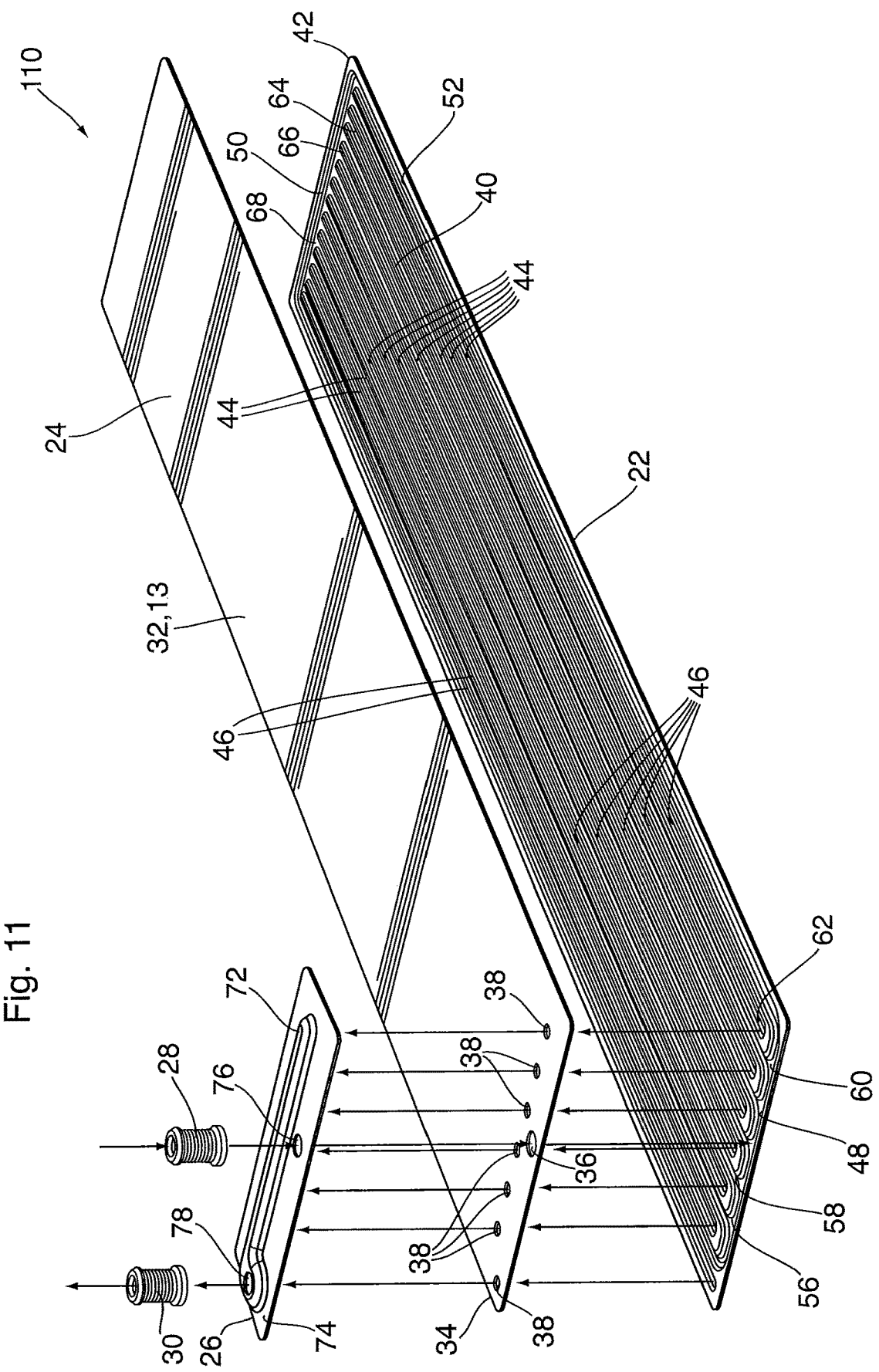
FIG. 11 is a perspective exploded view of the counterflow heat exchanger of FIG. 10.
Figure 12:
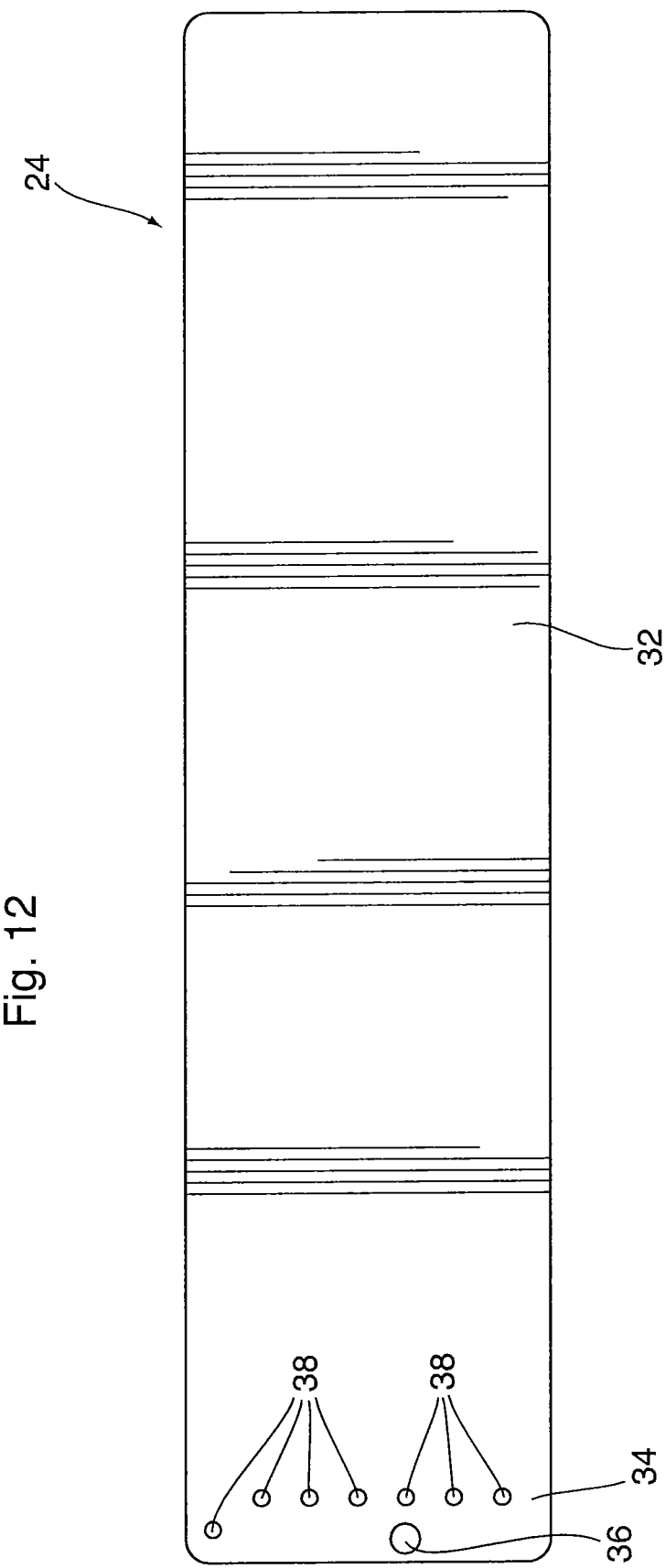
FIG. 12 is a plan view of the cover plate of the counterflow heat exchanger of FIG. 10.

As shown in FIGS. 10 and 11, heat exchanger 110 comprises a cold plate heat exchanger similar to heat exchanger 1 of FIG. 1. As shown, heat exchanger 110 is comprised of two main heat exchanger plates, more specifically a formed base plate 22 and a cover plate 24, a manifold plate or manifold cover 26, and first and second tubular fittings 28, 30. Heat exchanger 110 is elongate, with the long sides thereof extending along longitudinal axis A.

Cover plate 24 has a first, generally planar region 32 upon which the individual battery cell containers 12 are stacked when the heat exchanger 110 is arranged together with the battery unit 100, as in FIGS. 1 and 2. The first region 32 of cover plate 24 defines the primary heat transfer surface 13 of heat exchanger 110. Cover plate 24 also includes a second generally planar region 34 formed at one end thereof, adjacent to first region 32, which is also referred to herein as "manifold region 34". Both the first and second regions 32, 34 of cover plate 24 are flat and planar, such that the entire cover plate 24 is flat and planar.

The manifold region 34 includes a plurality of first and second fluid openings 36, 38 arranged at spaced apart intervals across the width of the cover plate 24, the width being defined along transverse axis B. The manifold region 34 includes a single first fluid opening 36 and a plurality of second fluid openings 38. The cover plate 24 may include more or fewer second fluid openings 38 than the seven which are illustrated, the number of openings 38 depending on the number of fluid flow passages in the base plate 22.

Base plate 22 is generally in the form of an upside-down, dished-plate having a central, generally planar portion 40 surrounded by a peripheral flange 42, the central generally planar portion 40 being located below the plane of the peripheral flange 42 in the orientation shown in the drawings. A plurality of first and second fluid flow passages 44, 46 are formed in the central, generally planar portion 40 of the base plate 22, the first and second fluid flow passages 44, 46 extending generally between the opposed first and second ends 48, 50 of the central portion 40 of base plate 22, parallel to the longitudinal axis A.

The fluid flow passages 44, 46 are formed by elongate depressions or trough regions formed in the central, generally planar portion 40 of the base plate 22. The individual trough regions defining adjacent flow passages 44, 46 are separated by elongate ridges 52 extending continuously along the longitudinal axis A. In the present embodiment the elongate ridges 52 are generally straight and parallel to one another and axis A, although they may include non-linear regions in some embodiments. The elongate ridges 52 may have flat upper surfaces 54 which are generally co-planar with peripheral flange 42 and which, together with peripheral flange 42, provide contact surfaces or brazing surfaces for surface-to-surface contact with the cover plate 24 when the base plate 22 and cover plate 24 are brazed or otherwise sealed together.

Figure 13:
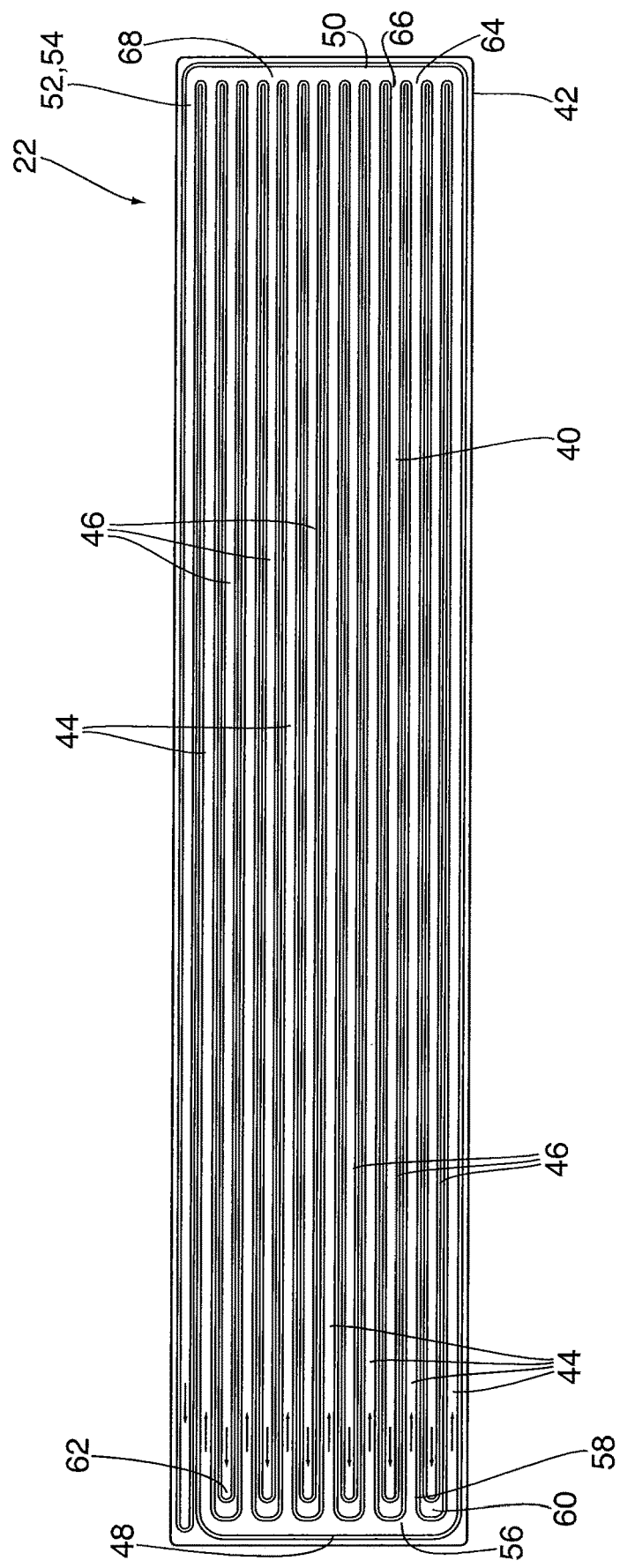
FIG. 13 is a plan view of the base plate of the counterflow heat exchanger of FIG. 10, illustrating the flow dynamics through the base plate.

The counterflow routing of fluid along the central portion 40 of base plate 22 is shown by the arrows in FIG. 13. Proximate to the first end 48 of the central portion 40 of base plate 22 there is provided a manifold region 56 which is enclosed between the cover plate 24 and the base plate 22 and is in fluid communication with first open ends 58 of the first fluid flow passages 44 and with the first fluid opening 36 in the cover plate 24. The manifold region 56 is formed by providing a gap between the first end 48 of central portion 40, and the first ends of elongate ridges 52. The manifold region 56 receives fluid from, or distributes fluid to, the first fluid flow passages 44, depending on whether it is an inlet manifold or outlet manifold.

As can be seen from FIGS. 11 and 13, the central portion 40 of base plate 22 also comprises a plurality of transverse ridges 60 joining the first end of each elongate ridge 52 to the first end of an adjacent elongate ridge 52. The transverse ridges 60 also have flat upper surfaces 54 which are sealed to the cover plate 24, for example by brazing, so as to close off the first ends 62 of the second fluid flow passages 46 and thereby prevent fluid communication between the manifold region 56 and the first ends 62 of the second fluid flow passages 46.

The elongate ridges 52 each have a second end which is spaced from the second end 50 of the central portion 40 of the base plate 22. This spacing provides the first and second fluid flow passages 44, 46 with open second ends 64, 66, and also provides a transverse gap 68 at the second end 50 of central portion 40. The transverse gap 68 is in flow communication with the open second ends 64, 66 of the first and second fluid flow passages 44, 46, thereby providing a manifold or turnaround space to allow the fluid flow to change direction and flow between the first and second fluid flow passages 44, 46.

In the present embodiment, the manifold region 56 comprises an inlet manifold which distributes the flow transversely across the base plate 22. From the manifold region 56, the fluid enters the open first ends 58 of first fluid flow passages 44 and flows toward the second end 50 of central portion 40, where it enters the transverse gap 68 through the open second ends 64 of the first fluid flow passages 44. The fluid then enters the open second ends 66 of the second fluid flow passages 46, and flows back toward the closed first ends 62 of the second fluid flow passages 46.

As mentioned above, cover plate 24 is provided with a transversely extending array of first and second fluid openings 36, 38. Each of the second fluid openings 38 is located so as to be aligned with the closed first end 62 of one of the second fluid flow passages 46 and in flow communication therewith. Therefore, the fluid reaching the closed first ends 62 of second fluid flow passages 46 will be discharged from the second flow passages 46 through second fluid openings 38.

The first fluid opening 36 is located so as to be aligned with the manifold region 56, and is therefore located close to the edge of the cover plate 24. Thus, fluid enters the manifold region 56 through the first fluid opening 36.

Manifold cover 26 is arranged over top of the manifold region 34 on cover plate 24. The manifold cover 26 has an embossment 72 surrounded by a peripheral flange 74 which is adapted to be sealed to the cover plate 24, for example by brazing, and to surround all the second fluid openings 38. The top surface of embossment 72 defines the top of the manifold cover 26; and the bottom surface of peripheral flange 74 defines the bottom of the manifold cover 26.

The flange 74 of manifold cover 26 is provided with a first fluid opening 76 and first tubular fitting 28, and the top of the manifold cover 26 (i.e. the top of embossment 72) is provided with a second fluid opening 78 and second tubular fitting 30. The fittings 28, 30 are sealingly attached to the manifold cover 26, for example by brazing.

In the present embodiment, the first fluid opening 76 and first tubular fitting 28 comprise the fluid inlet of heat exchanger 110, and are sometimes referred to herein as "inlet opening 76" and "inlet fitting 28", respectively. The second fluid opening 78 and second tubular fitting 30 comprise the fluid outlet of heat exchanger 110, and are sometimes referred to herein as the "outlet opening 78" and "outlet fitting 30", respectively.

The interior of the embossment 72 defines a manifold chamber 80 which is in flow communication with all the second fluid openings 38 in the cover plate 24, but is sealed from flow communication with the first fluid opening 36 by flange 74. In the present embodiment, the manifold chamber 80 comprises an outlet manifold which receives the fluid discharged from second fluid flow passages 46 through second fluid openings 38. The second fluid opening 78 is in flow communication with the manifold chamber 80, so as to receive fluid discharged from the second fluid flow passages 46 through the second fluid openings 38.

Figure 14:
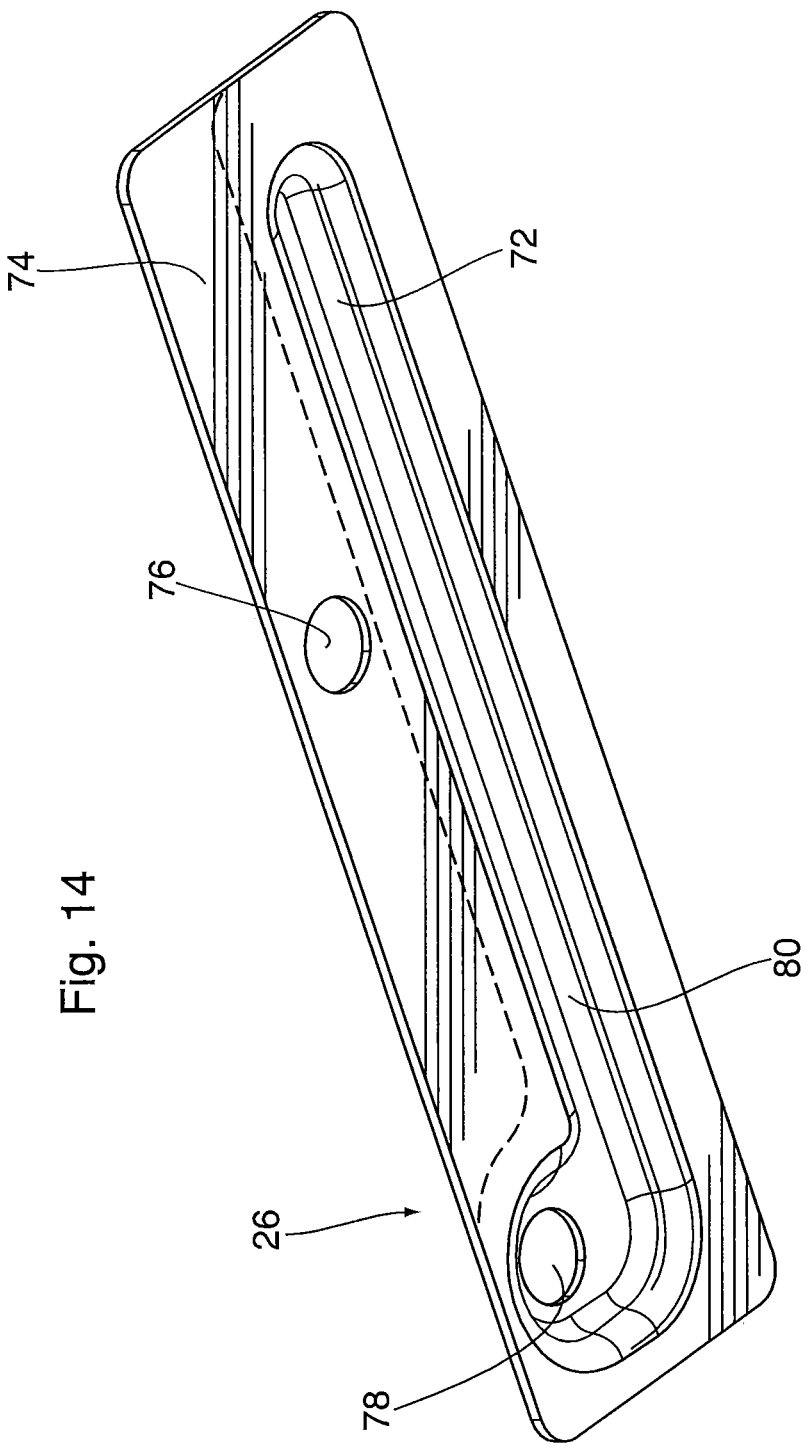
FIG. 14 is a perspective view of the underside of the manifold cover of the counterflow heat exchanger of FIG. 10.
Figure 15:
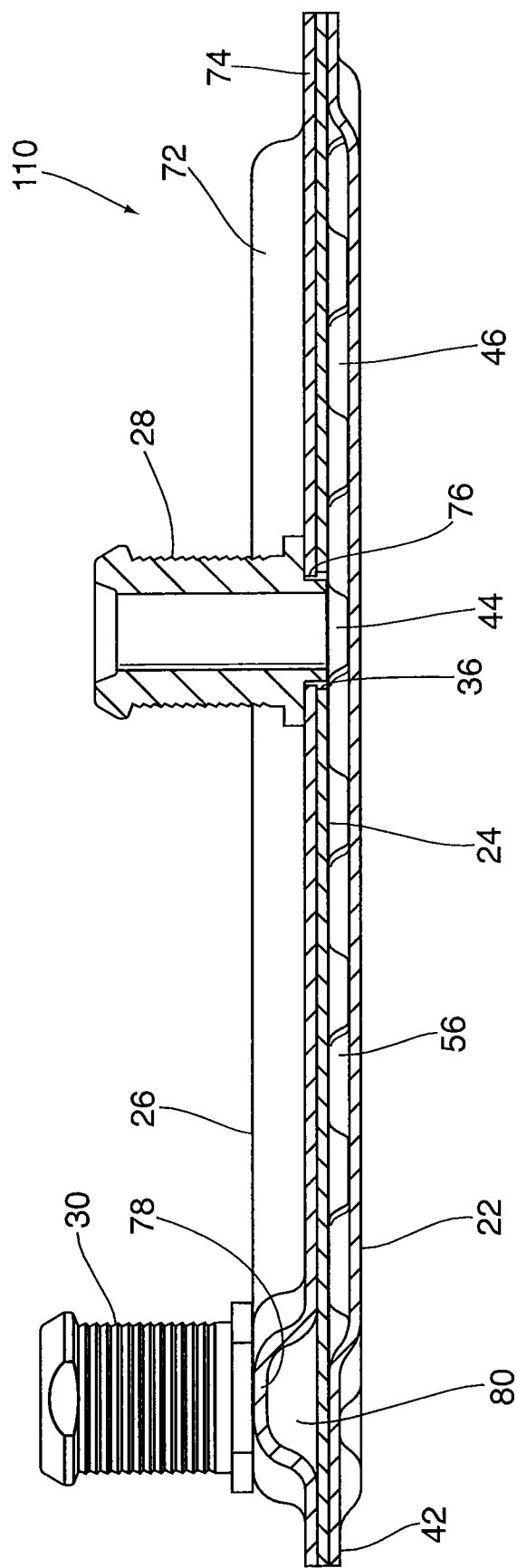
FIG. 15 is a cross-section along line 15-15' of FIG. 10.
Figure 16:
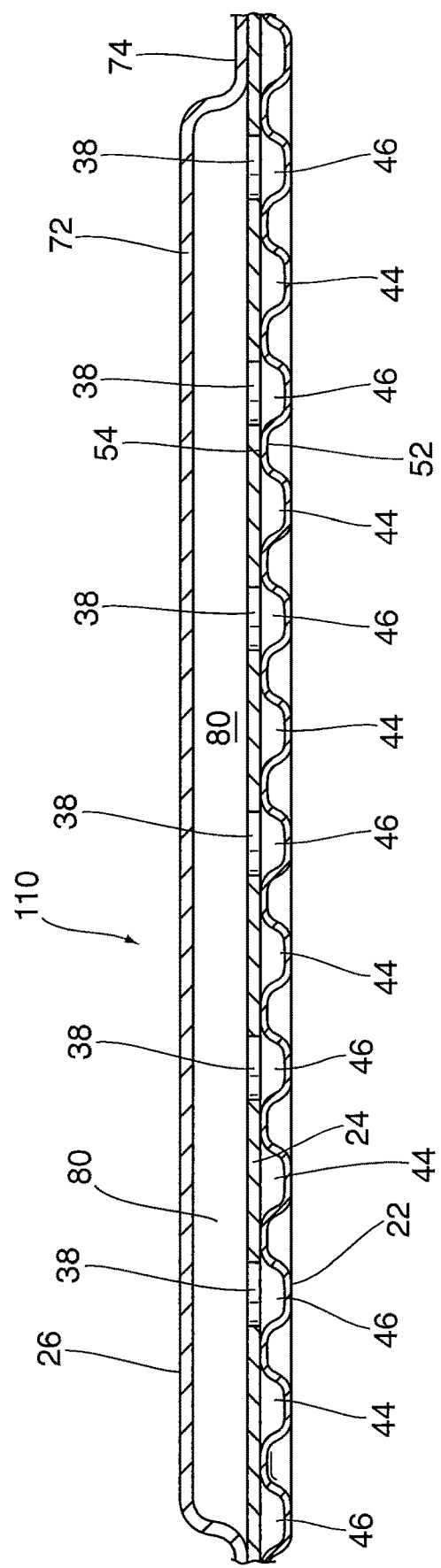
FIG. 16 is a cross-section along line 16-16' of FIG. 10.

As can be seen from FIG. 14, the manifold cover 26 of heat exchanger 110 is simpler than the manifold cover of heat exchanger 10, because it does not require a fluid flow conduit 82 extending through the manifold chamber 80. Rather, the first fluid opening 76 of the manifold cover 26 is formed in flange 74 and is in direct flow communication with the manifold region 56 of base plate 22 through the first fluid opening 36 of cover plate 24.

In the present embodiment, the embossment 72 of the manifold cover 26 is L-shaped, having a first transverse segment covering the plurality of second fluid openings and a second longitudinal segment extending the embossment to permit the positions of the second fluid opening 78 and second fitting 30 to be longitudinally offset from the positions of at least some of the second fluid flow openings 38 of cover plate 24, and to have closer transverse alignment with the first fluid opening 76 and the first fitting 28. Although the manifold cover 26 of heat exchanger 110 is shown as being L-shaped, it will be appreciated that other configurations are possible. In particular, it will be appreciated that the locations of the second fluid opening 78 and second fitting 30 may be shifted transversely and/or longitudinally from the location illustrated in the drawings.

It will also be appreciated that the flange 74 may be made narrower as shown by the dotted line in FIG. 14 so as to avoid covering the first fluid opening 36 of cover plate 24, and thereby eliminating the need to provide a first fluid opening 76 in flange 74. In this case, the first fitting 28 is secured directly to the cover plate 24, in direct flow communication with the first fluid opening 36. Also, the locations of first fluid openings 36, 76 can be shifted transversely from the position shown in the drawings, to any location along the width of the heat exchanger 110 at which the first fluid openings 36, 76 remain in flow communication with manifold region 56.

In use, fluid entering the heat exchanger 110 through first fluid fitting 28 and first fluid opening 76 in embossment 72 is distributed to each of the first flow passages 44 through first fluid opening 36 of cover plate 24 and through manifold region 56, and flows through each of the individual first fluid flow passages 44 from the first end 48 to the second end 50 of the central portion 40 of base plate 22. Once the fluid reaches the second end 50, it reverses direction at transverse gap 68 and then flows through the second fluid flow passages 46 toward the first end 48. The fluid then flows through second fluid openings 38 in cover plate 24 and enters manifold chamber 80 before exiting the heat exchanger 110 through second fluid opening 78 and second fluid fitting 30.

As in heat exchanger 10, the fluid openings 76, 78 and the tubular fittings 28, 30 of heat exchanger 110 may be side-by-side or "in-line", such that they are collinearly arranged along the transverse axis B.

A counterflow heat exchanger 120 according to a third embodiment is now described with reference to FIGS. 17-18, with like reference numerals being used to identify similar features.

Heat exchanger 120 is comprised of two main heat exchanger plates, more specifically a formed base plate 22 and a cover plate 24, a manifold plate or manifold cover 26, and a combined inlet/outlet fitting 92. Heat exchanger 120 is elongate, with the long sides thereof extending along longitudinal axis A.

The base plate 22 and cover plate 24 of heat exchanger 120 may be similar or identical to base plate 22 and cover plate 24 of heat exchanger 120 described above. Accordingly, the following description of heat exchanger 120 does not include a detailed description of plates 22 and 24, and it will be understood that the above description of these components in relation to heat exchanger 10 applies equally to the present embodiment.

The manifold cover 26 is arranged over top of the manifold region 34 on cover plate 24. Manifold cover 26 has an embossment 72 surrounded by a peripheral flange 74 which is adapted to be sealed to the cover plate 24, for example by brazing, and to surround all the first and second fluid openings 36, 38. The top surface of embossment 72 defines the top of the manifold cover 26; and the bottom surface of peripheral flange 74 defines the bottom of the manifold cover 26.

The top of the manifold cover 26 (i.e. the top of embossment 72) is provided with a single fluid opening 90, and the interior of embossment 72 defines a manifold chamber 80 which is in flow communication with all the second fluid openings 38 in the cover plate 24. Therefore, the manifold chamber 80 comprises an outlet manifold which receives the fluid discharged from second fluid flow passages 46 through second fluid openings 38.

The inlet/outlet fitting 92 includes a central inlet passage 94 and an annular outlet passage 96. Surrounding the outlet passage 96 is an annular flange 98 which is adapted to be secured to the top of manifold cover 26, surrounding the fluid opening 90. The annular outlet passage 96 of fitting 92 is in flow communication with the interior of manifold chamber 80, so as to receive fluid discharged from the second fluid flow passages 46 through the second fluid openings 38 of cover plate 24.

The inlet passage 94 of fitting 92 includes a tubular extension portion 102 extending downwardly below the bottom of the outlet passage 96 and annular flange 98. The extension portion 102 corresponds in function to the fluid flow conduit 82 of heat exchanger 10, and extends from the top of the manifold cover 26 to the bottom of manifold cover 26, and has a sealing surface 104 at its bottom end for sealing to the cover plate 24, for example by brazing. In the present embodiment, the extension portion 102 extends into the first fluid opening 36 of cover plate 24, and therefore the sealing surface 104 comprises a side surface of extension portions 102, which engages the inner peripheral edge of the first fluid opening 36, and forms a sealed connection therewith. The extension portion 102 thereby provides a sealed passage through the manifold chamber 80. Therefore, the fluid entering heat exchanger 120 through inlet/outlet fitting 92 will flow through the extension portion 102, through first opening 36, into the manifold region 56 of base plate 22, and from there the fluid flows into the first fluid flow passages 44.

In use, fluid entering the heat exchanger 120 through the inlet passage 94 of fitting 92 flows through the extension portion 102, and is distributed to each of the first flow passages 44 through first fluid opening 36 of cover plate 24 and through manifold region 56, and flows through each of the individual first fluid flow passages 44 from the first end 48 to the second end 50 of the central portion 40 of base plate 22. Once the fluid reaches the second end 50, it reverses direction at transverse gap 68 and then flows through the second fluid flow passages 46 toward the first end 48. The fluid then flows through second fluid openings 38 in cover plate 24 and enters manifold chamber 80 before exiting the heat exchanger 120 through the annular outlet passage 96 of fitting 92. The fitting 92 may include separate inlet and outlet branch fittings 106, 108 for connection to a coolant circulation system of a vehicle.

Figure 18:
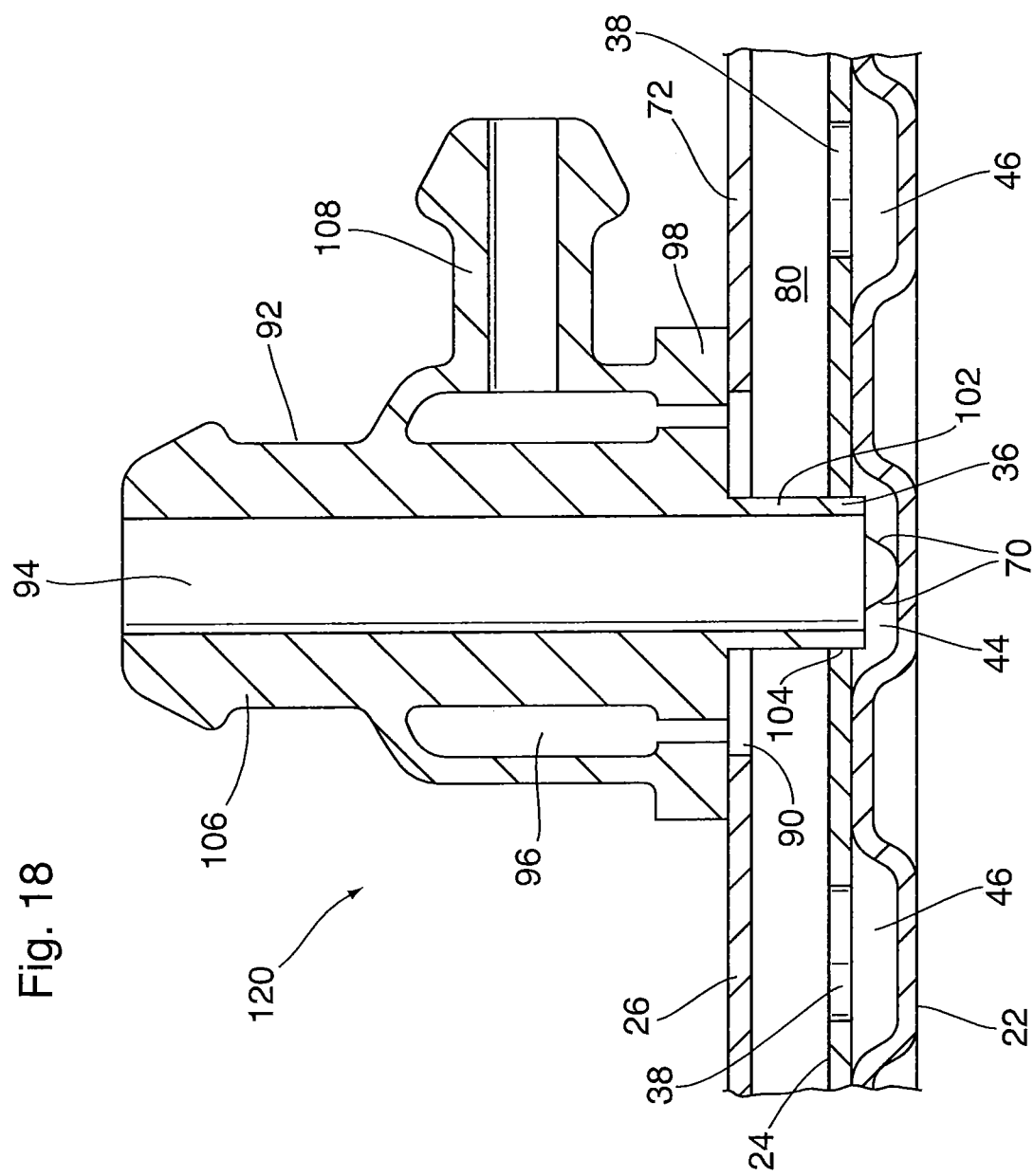
FIG. 18 is a partial, enlarged cross-section along line 18-18' of FIG. 17.
Figure 19:
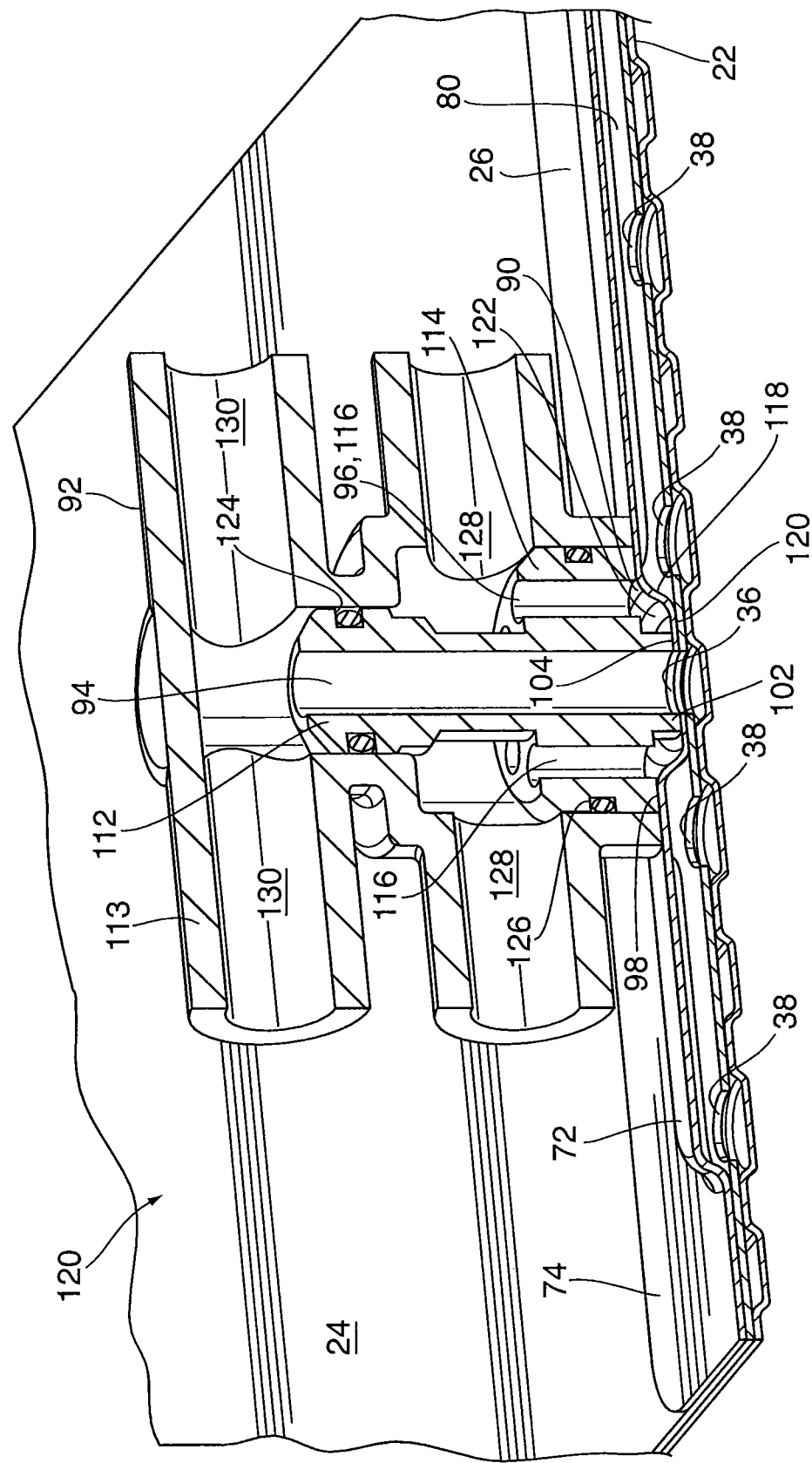
FIG. 19 is partial cross-sectional view of a counterflow heat exchanger according to a fourth embodiment of the present disclosure.
Figure 20:
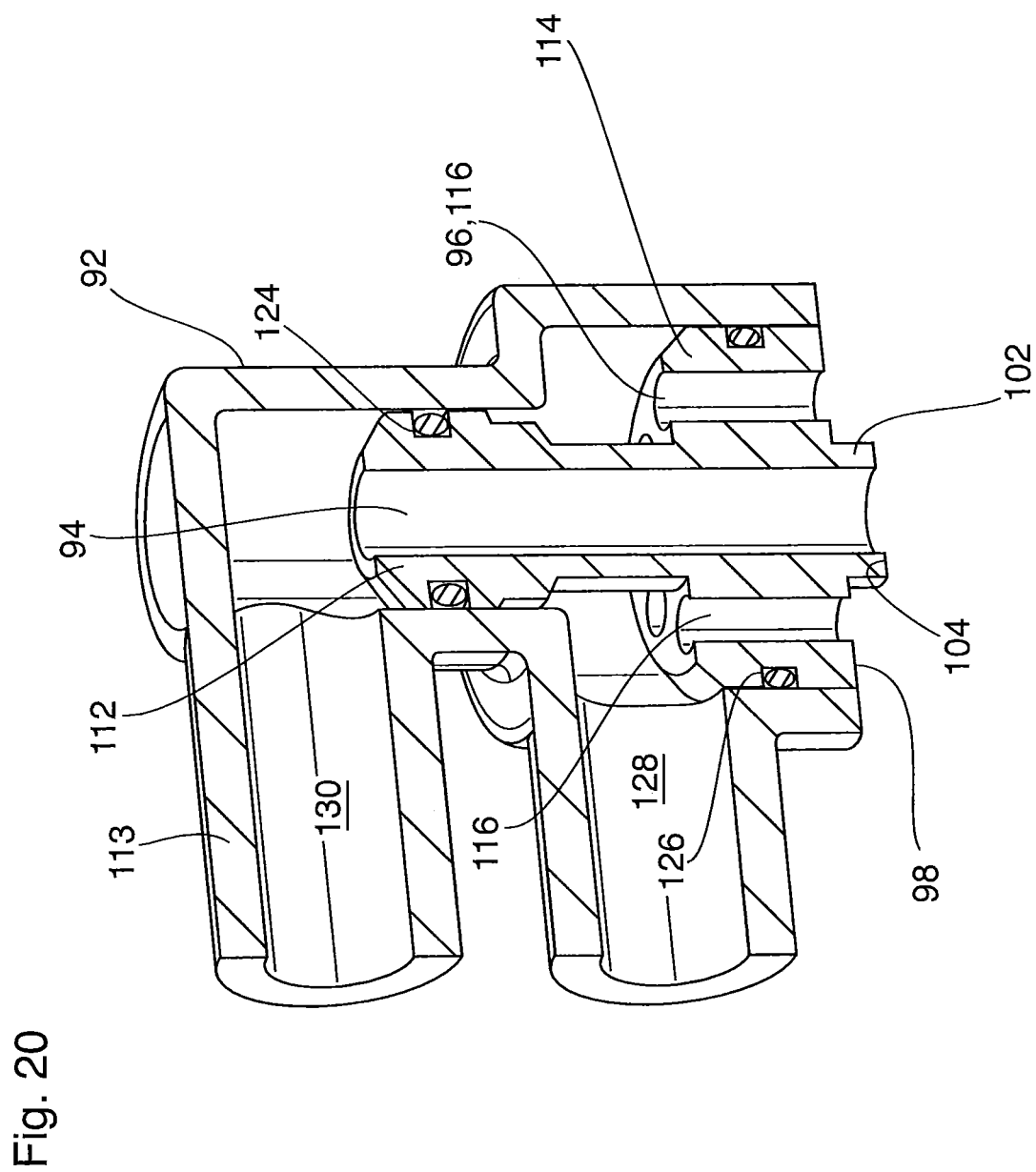
FIG. 20 is a cross-sectional view of a combined inlet/outlet fitting for use in a counterflow heat exchanger according to the present disclosure.

FIGS. 19 and 20 illustrate slightly different versions of heat exchanger 120. The above description of heat exchanger 120 shown in FIGS. 17 and 18 applies equally to the heat exchangers 120 shown in FIGS. 19 and 20, except where specifically indicated otherwise in the following description.

In FIGS. 19 and 20, the inlet/outlet fitting 92 has a two-piece construction, comprising an inner portion 112 which may be comprised of a brazeable metal such as aluminum, and an outer portion 113 which may be comprised of plastic. The inner portion 112 includes central inlet passage 94, a lower portion of which is surrounded by a radial extension portion 114 provided with a plurality of cylindrical bores 116 which comprise the annular outlet passage 96. The annular flange 98 which is sealingly connected to the cover plate 24 around fluid opening 90 comprises the bottom surface of the radial extension portion 114.

Figure 17:
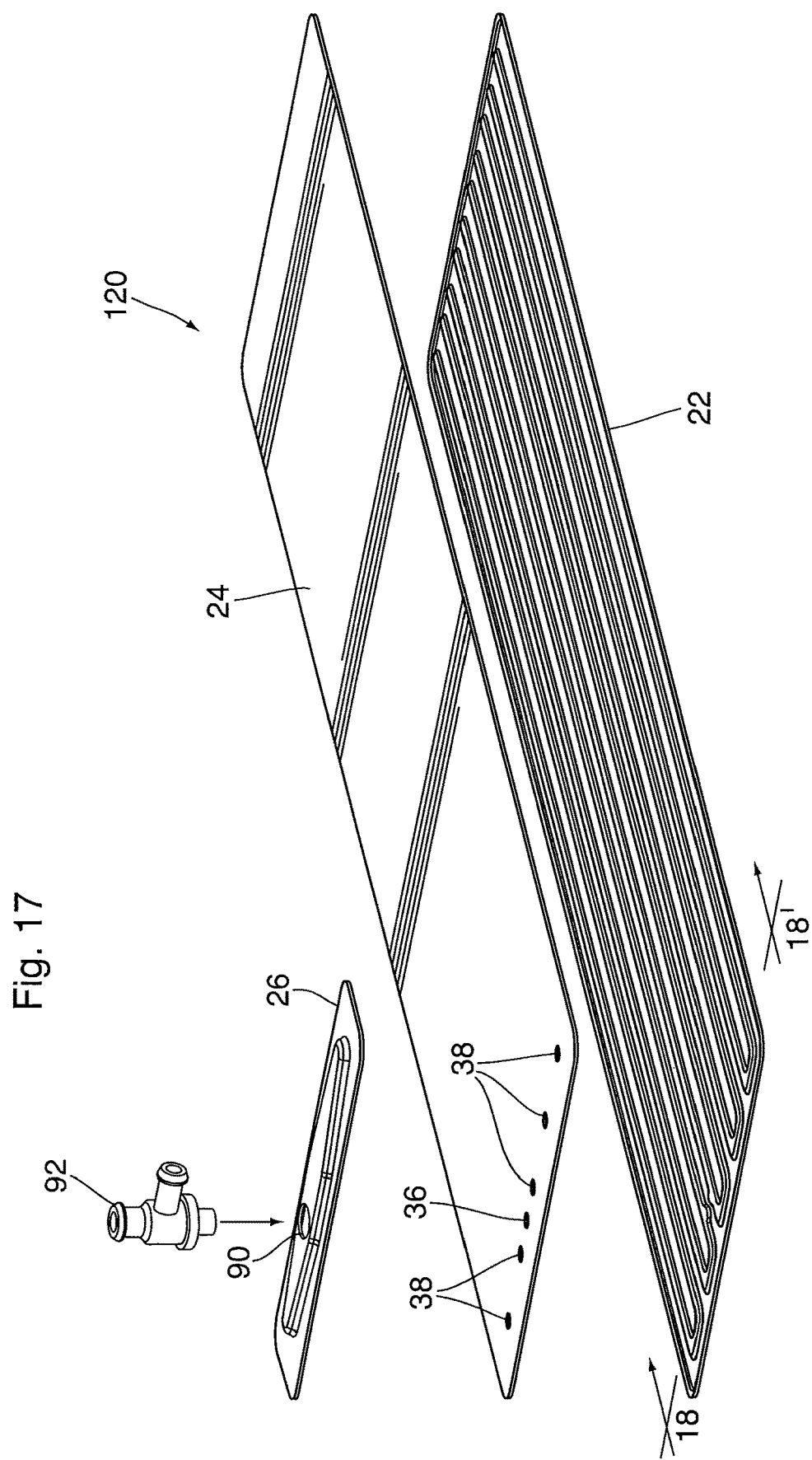
FIG. 17 is a perspective exploded view of a counterflow heat exchanger according to a third embodiment of the present disclosure.

The configuration of the fluid opening 90 in FIGS. 19 and 20 is somewhat different from that of FIGS. 17 and 18. In this regard, the fluid opening 90 in FIGS. 19 and 20 comprises an apertured boss 118 similar to that comprising the fluid flow conduit 82 in heat exchanger 10 described above, the apertured boss 118 having an annular sealing surface 120 which is sealed to the cover plate 24 in the area surrounding the first opening 36. In addition, the lower end surface of extension portion 102 is sealed to the apertured boss 118, and more specifically to a surface which is opposite to the annular sealing surface 120 thereof.

In contrast to the fluid flow conduit 82 of heat exchanger 10, the side surface of the apertured boss 118 is provided with a plurality of openings 122 which permit flow communication between the manifold chamber 80 of embossment 72 and the cylindrical bores 116 comprising the annular outlet passage 96.

The inner portion 112 of inlet/outlet fitting 92 may be assembled with the other metal components of heat exchanger 120 during brazing of the components in a brazing furnace. The outer portion 113, which may be molded from plastic, may then be placed over top of the inner portion 112 and sealed thereto by providing O-rings in grooves 124, 126.

The versions of heat exchanger 120 shown in FIGS. 19 and 20 are identical, except with regard to the configurations of the inlet and outlet ports of the outer portion 113. The outer portion 113 of FIG. 19 has a pair of oppositely directed outlet ports 128 in flow communication with the annular outlet passage 96, and a pair of oppositely directed inlet ports 130 in flow communication with the inlet passage 94. The inlet and outlet ports 128, 130 are tubular in form and are parallel to one another and to the cover plate 24.

In the version shown in FIG. 20, the there is one outlet port 128 in flow communication with the annular outlet passage 96, and one inlet port 130 in flow communication with the inlet passage 94. The inlet and outlet ports 128, 130 are tubular in form and are parallel to one another and to the cover plate 24.

Figure 21:
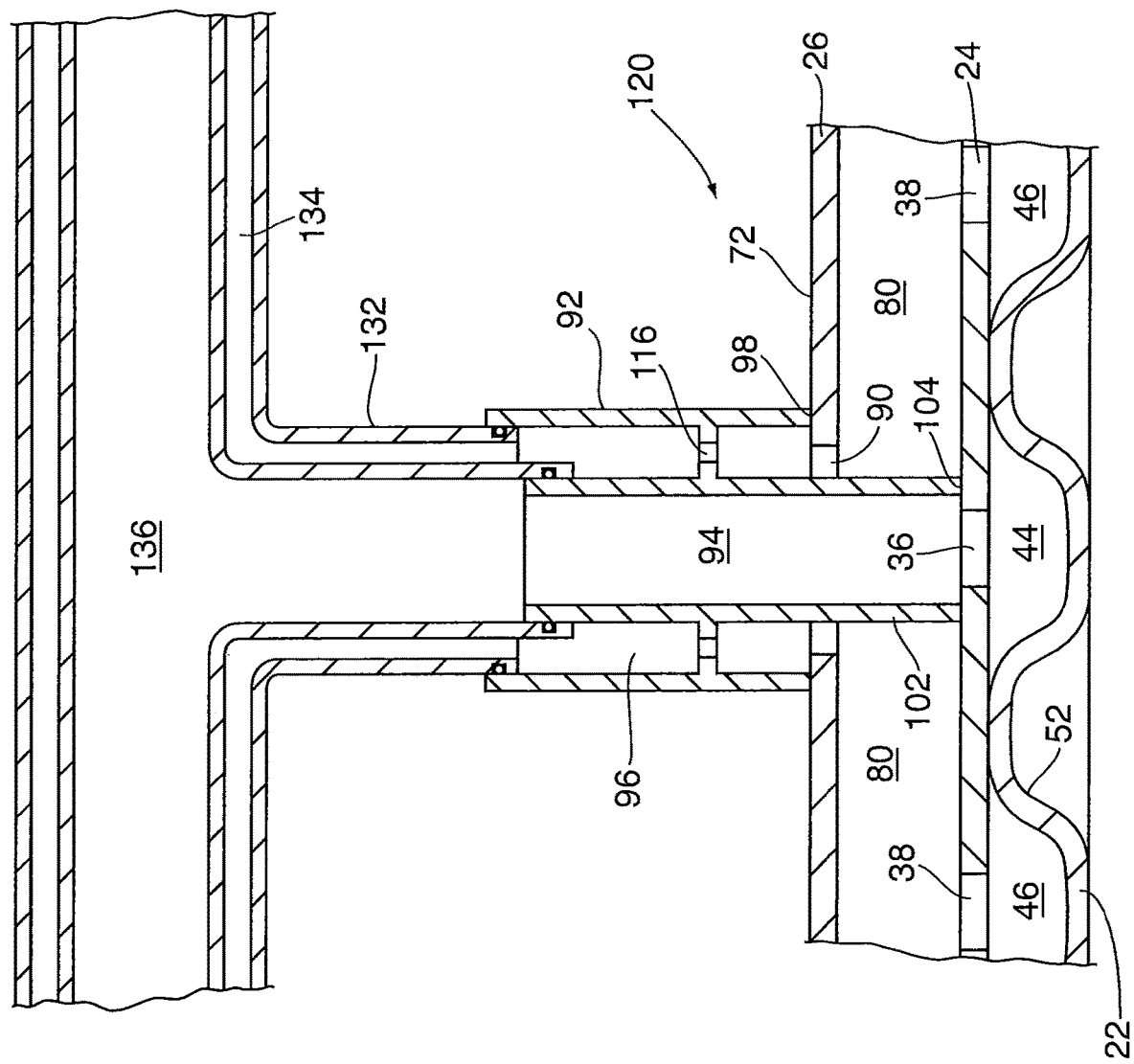
FIG. 21 is partial cross-sectional view of a counterflow heat exchanger according to a fifth embodiment of the present disclosure.

FIG. 21 illustrates a heat exchanger 120 according to a fifth embodiment which is specifically adapted for connection to two-walled tubing comprising an inner tube and an outer tube.

FIG. 21 illustrates an inlet/outlet fitting 92 similar in structure to those described above. The fitting 92 comprises a straight fitting comprising concentric tubes, wherein the inner tube defines the inlet passage 94, and the annular region between the tubes defining the outlet passage 96. The fitting 92 is adapted for connection to a two-walled tube 132 comprising two concentrically arranged tubes defining an inlet passage 136 and an outlet passage. The tubes of the two-walled tube 132 are adapted for connection to the walls of the tubes making up the fitting 92. The two-walled tube 132 may be made of plastic, and each of the tubes may include an O-ring which connects to the fitting 92 via an insertion and holding feature.

As shown in FIG. 21, the two-walled tube 132 may include a T-connector having a pair of oppositely directed branches, with each of the branches comprising a two-walled tube. The two-walled T-connector is adapted for connection of a plurality of heat exchangers 120 in series.

Figure 22:
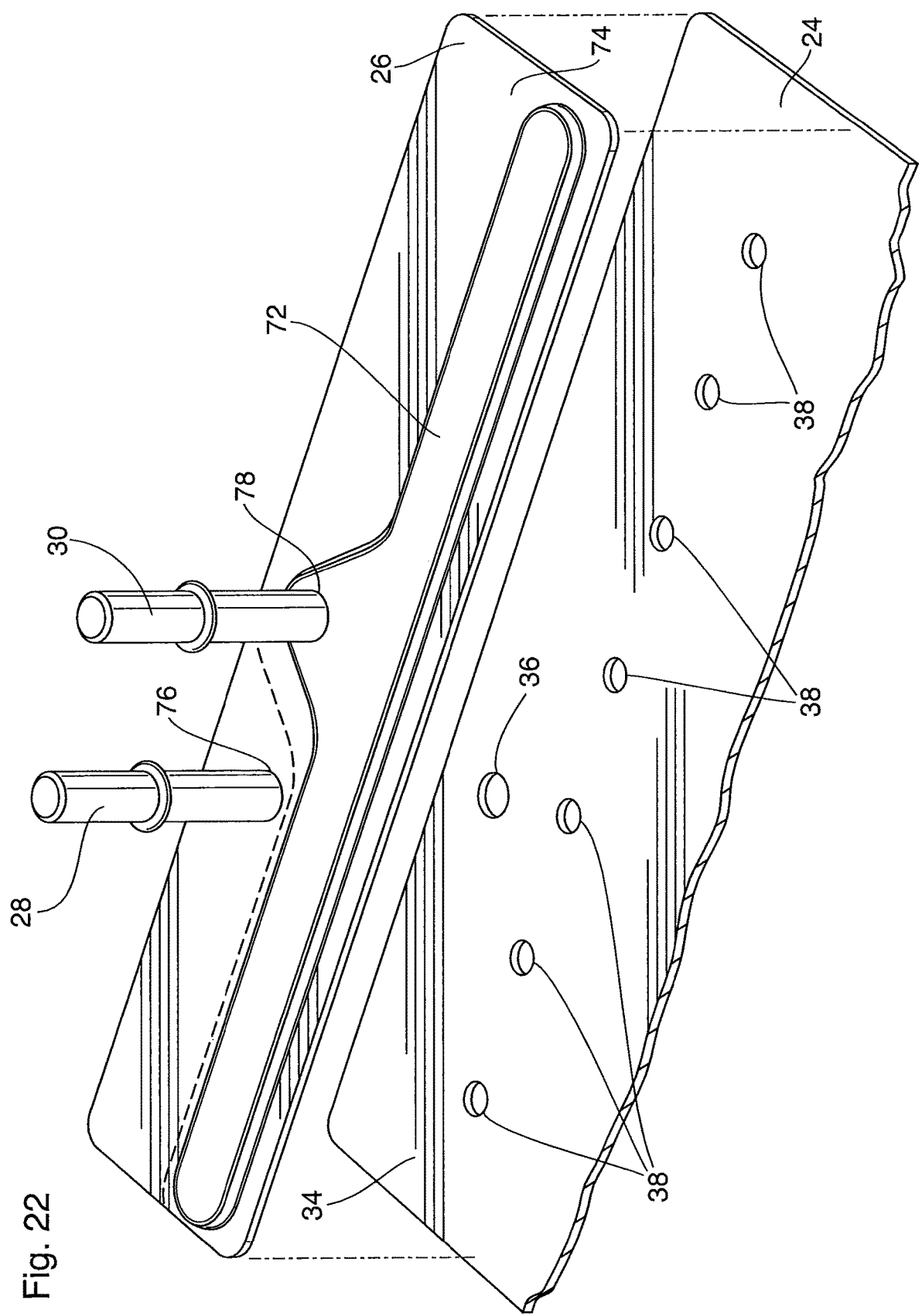
FIG. 22 is a partial view of a counterflow heat exchanger according to a sixth embodiment of the present disclosure.

FIG. 22 partially illustrates a counterflow heat exchanger according to a sixth embodiment, having a slightly different configuration from heat exchanger 110 described above and shown in FIGS. 11-16. In particular, FIG. 22 shows the second generally planar portion 34 of the cover plate 24, including a plurality of transversely aligned second openings 38 and a first opening 36 located between the plurality of second openings 38 and an edge of the cover plate 24 in the second generally planar portion 34. Also shown is the manifold cover 26 of the heat exchanger. The base plate 22 of the sixth embodiment is identical to that of heat exchanger 110, and the cover plate 24 of the sixth embodiment differs from that shown in FIGS. 11 and 12 in that the second plurality of holes 38 are all transversely aligned with one another across the plate 24. Accordingly, the above descriptions of the cover plate 24 and base plate 22 of heat exchanger 110 apply equally to the heat exchanger according to the sixth embodiment shown in FIG. 22.

It can be seen from FIG. 22 that fitting 30 is located close to the middle of manifold cover 26 so that it is in close proximity to fitting 28, and that the embossment 72 is generally linear except for a bulging portion close to the middle of embossment, with the fitting 30 and opening 78 being located in this bulging portion. As can be seen in FIG. 22, the bulging portion extends longitudinally in the direction of the opening 76 and fitting 28, to permit the second fitting 30 to be longitudinally offset from the positions of the second fluid flow openings 38 of cover plate 24, and to have closer transverse alignment with the first fluid opening 76 and the first fitting 28. In other respects the manifold cover 26 of FIG. 22 is the same as that of heat exchanger 110.

Similar to FIG. 14, FIG. 22 includes a dotted line to show that the flange 74 may be made narrower so that it does not cover the first fluid opening 36 of cover plate 24, thereby eliminating the need to provide a first fluid opening 76 in flange 74. In this case, the first fitting 28 is secured directly to the cover plate 24, in direct flow communication with the first fluid opening 36.

While various embodiments of heat exchangers for battery thermal management applications have been described, it will be understood that certain adaptations and modifications of the described embodiments can be made. Therefore, the above discussed embodiments are considered to be illustrative and not restrictive.

What is claimed is:

1. A counterflow heat exchanger for thermal management of a battery unit having at least one battery cell container, each housing one or more battery cells, comprising:
    a base plate having a central, generally planar portion having opposed first and second ends, the central portion being surrounded by a peripheral flange and including a plurality of alternating first and second fluid flow passages extending between the first and second ends of the central portion, wherein each of the first and second fluid flow passages has a first end and a second end, and is parallel to a longitudinal axis of the heat exchanger;
    a cover plate arranged over a top of, and in sealing engagement with, said base plate enclosing said plurality of first and second fluid flow passages therebetween, the cover plate having a first, generally planar region defining a primary heat transfer surface of the heat exchanger, and a second generally planar region formed at one end of the cover plate, the second generally planar region including a first fluid opening and a plurality of second fluid openings arranged at spaced apart intervals across a width of the cover plate; and
    a manifold cover arranged over a top of the second generally planar region of the cover plate, the manifold cover comprising an embossment surrounded by a peripheral flange which is sealed to the cover plate and surrounds at least the plurality of second fluid openings;
    wherein a top surface of the embossment defines a top of the manifold cover and a bottom surface of the peripheral flange of the manifold cover defines a bottom of the manifold cover;
    wherein an interior of the embossment defines a manifold chamber which is in flow communication with the plurality of second fluid openings in the cover plate;
    wherein the top of the manifold cover is provided with at least a second fluid opening which is in flow communication with the plurality of second fluid openings through the manifold chamber.

2. The counterflow heat exchanger of claim 1, wherein the first fluid opening and the plurality of second fluid openings of the cover plate are arranged in a single row parallel to a transverse axis of the heat exchanger; such that centers of the first and second fluid openings of the cover plate are equidistantly spaced from an end of the heat exchanger.

3. The counterflow heat exchanger of claim 1, further comprising a first tubular fitting in communication with the first fluid opening and a second tubular fitting in communication with the plurality of second fluid openings, wherein the second tubular fitting is provided in the second fluid opening of the manifold cover, and wherein the first and second tubular fittings are equidistantly spaced from an end of the heat exchanger.

4. The counterflow heat exchanger of claim 1, wherein the base plate includes a manifold region proximate to the first end of the central, generally planar portion;
    wherein the manifold region is in fluid communication with the first ends of the plurality of first fluid flow passages, the first ends of the plurality of first fluid flow passages being open;
    wherein the manifold region is enclosed between the cover plate and the base plate; and
    wherein the first fluid opening in the cover plate is in flow communication with the manifold region.

5. The counterflow heat exchanger of claim 1, wherein the first and second fluid flow passages comprise elongate depressions in the central portion of the base plate, the depressions being separated by elongate ridges extending continuously along the longitudinal axis; and
    wherein the elongate ridges have flat upper surfaces which are co-planar with the peripheral flange of the base plate and which are in contact with the cover plate.

6. The counterflow heat exchanger of claim 5, wherein the base plate includes a manifold region proximate to the first end of the central portion;
    wherein the manifold region is in fluid communication with the first ends of the plurality of first fluid flow passages, the first ends of the plurality of first fluid flow passages being open;
    wherein the manifold region is formed by providing gaps between the first end of the central portion and first ends of the elongate ridges.

7. The counterflow heat exchanger of claim 6, wherein the central portion of the base plate further comprises a plurality of transverse ridges joining a first end of each said elongate ridge to a first end of an adjacent elongate ridge;
    wherein the transverse ridges have flat upper surfaces which are sealed to the cover plate; and
    wherein the transverse ridges close off the first ends of the second fluid flow passages to prevent fluid communication between the manifold region and the first ends of the second fluid flow passages.

8. The counterflow heat exchanger of claim 5, wherein the elongate ridges each have a second end which is spaced from the second end of the central portion of the base plate, so as to form a transverse gap at the second end of the central portion;
    wherein the transverse gap is in flow communication with the second ends of the first and second fluid flow passages, wherein the second ends of the first and second fluid flow passages are open.

9. The counterflow heat exchanger of claim 1, wherein the first ends of the second fluid flow passages are closed, and each of the second fluid openings is located so as to be aligned with the closed first end of one of the second fluid flow passages and in flow communication therewith.

10. The counterflow heat exchanger of claim 1, wherein the first fluid opening of the cover plate is aligned with one of the first fluid flow passages and in flow communication with a manifold region.

11. The counterflow heat exchanger of claim 10, wherein the first fluid flow passage which is aligned with the first fluid opening of the cover plate is at least partially blocked at a point between the first fluid opening and the second end of the central portion of the base plate.

12. The counterflow heat exchanger of claim 11, wherein elongate ridges defining the at least partially blocked first flow passage include protrusions extending into the at least partially blocked first flow passage.

13. The counterflow heat exchanger of claim 1, wherein the peripheral flange of the manifold cover also surrounds the first fluid opening in the cover plate.

14. The counterflow heat exchanger of claim 1, wherein the top of the manifold cover further comprises a first fluid opening, and wherein the manifold cover further comprises a fluid flow conduit which extends from the first fluid opening at the top of the manifold cover to the bottom of the manifold cover;
wherein the fluid flow conduit has a sealing surface at its bottom end which is sealed to the cover plate, such that the fluid flow conduit provides flow communication between the first fluid opening of the cover plate and the first fluid opening of the manifold cover, and provides a sealed passage through the manifold chamber.

15. The counterflow heat exchanger of claim 14, wherein the fluid flow conduit is integrally formed as part of the manifold cover, and is in the form of an apertured boss protruding downwardly from the top of the manifold cover.

16. The counterflow heat exchanger of claim 15, wherein the first fluid opening of the cover plate is aligned with a manifold region, and is located close to an edge of the cover plate, and closer to the edge of the cover plate than the plurality of second fluid openings.

17. The counterflow heat exchanger of claim 1, wherein the peripheral flange of the manifold cover surrounds only the second fluid openings, and not the first fluid opening.

18. The counterflow heat exchanger of claim 17, wherein the peripheral flange of the manifold cover is provided with a first fluid opening and a first tubular fitting, such that the manifold chamber of the manifold cover is sealed from flow communication with the first fluid opening of the cover plate by the peripheral flange.

19. The counterflow heat exchanger of claim 18, wherein the embossment of the manifold cover is shaped such that positions of the second fluid opening and a second fitting are longitudinally offset from positions of at least some of the second fluid openings of the cover plate, and such that the second fluid opening and the second fitting are transversely aligned with the first fluid opening and the first fitting.

20. The counterflow heat exchanger of claim 1, wherein the peripheral flange of the manifold cover surrounds the first fluid opening and the plurality of second fluid openings of the cover plate;
wherein the top surface of the embossment defines the top of the manifold cover and the bottom surface of the peripheral flange defines the bottom of the manifold cover;
wherein the interior of the embossment defines the manifold chamber which is in flow communication with the plurality of second fluid openings in the cover plate;
wherein the heat exchanger further comprises a combined inlet/outlet fitting having a central inlet passage and an annular outlet passage;
wherein the inlet/outlet fitting further comprises an annular flange surrounding the outlet passage, wherein the annular flange is secured to the top of the manifold cover and surrounds the second fluid opening of the manifold cover;
wherein the annular outlet passage of the inlet/outlet fitting is in flow communication with the interior of the manifold chamber, so as to receive fluid discharged from the second fluid flow passages through the second fluid openings of the cover plate; and
wherein the inlet passage of the inlet/outlet fitting includes a tubular extension portion extending downwardly below the outlet passage and the annular flange, the tubular extension having a sealing surface at its bottom end which is sealed to the cover plate.

21. The counterflow heat exchanger of claim 20, wherein an extension portion extends into the first fluid opening of the cover plate and forms a sealed connection therewith.

22. The counterflow heat exchanger of claim 20, wherein the combined inlet/outlet fitting has a two-piece construction, comprising an inner portion comprised of a brazeable metal, and an outer portion comprised of plastic;
wherein a lower portion of the inlet passage is surrounded by a radial extension portion provided with a plurality of cylindrical bores which together comprise the annular outlet passage; and
wherein the inlet/outlet fitting further comprises an annular flange surrounding the outlet passage, wherein the annular flange is secured to the top of the manifold cover and surrounds the second fluid opening of the manifold cover; and
wherein the annular flange comprises a bottom surface of the radial extension portion.

23. The counterflow heat exchanger of claim 22, wherein the second fluid opening of the manifold cover comprises an apertured boss having an annular sealing surface which is sealed to the cover plate in an area surrounding the first fluid opening thereof;
wherein the inlet passage of the inlet/outlet fitting includes the tubular extension portion extending downwardly below the outlet passage and the annular flange, the tubular extension portion having the sealing surface at its bottom end; and
wherein the sealing surface of the tubular extension portion is sealed to a surface of the apertured boss which is opposite to the annular sealing surface.

24. The counterflow heat exchanger of claim 23, wherein the apertured boss has a side surface which is provided with one or more openings to permit flow communication between the manifold chamber of the embossment and the cylindrical bores comprising the annular outlet passage.

* * * * *